US012719636B2

(12) United States Patent
Hu et al.

(10) Patent No.: US 12,719,636 B2
(45) Date of Patent: Aug. 25, 2026

(54) COMMUNICATION METHOD AND APPARATUS

(71) Applicant: HUAWEI TECHNOLOGIES CO., LTD., Shenzhen (CN)

(72) Inventors: Dan Hu, Beijing (CN); Lei Guan, Beijing (CN); Ruixiang Ma, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 840 days.

(21) Appl. No.: 17/942,915

(22) Filed: Sep. 12, 2022

(65) Prior Publication Data

US 2023/0006797 A1 Jan. 5, 2023

Related U.S. Application Data

(63) Continuation of application No. PCT/CN2020/079063, filed on Mar. 12, 2020.

(51) Int. Cl.
*H04L 5/00* (2006.01)
*H04L 1/1812* (2023.01)
*H04W 72/23* (2023.01)

(52) U.S. Cl.
CPC .......... *H04L 5/0053* (2013.01); *H04L 1/1812* (2013.01); *H04W 72/23* (2023.01)

(58) Field of Classification Search
CPC ..... H04L 5/0053; H04L 1/1812; H04W 72/23
See application file for complete search history.

(56) References Cited

U.S. PATENT DOCUMENTS

2020/0022144 A1* 1/2020 Papasakellariou .... H04L 5/0044
2021/0250918 A1* 8/2021 Liu ...................... H04L 5/0053

FOREIGN PATENT DOCUMENTS

CN 109392062 A 2/2019
EP 3451553 A2 * 3/2019 .......... H04B 7/0617
EP 3599733 A1 1/2020
(Continued)

OTHER PUBLICATIONS

3GPP TS 38.212 V1.2.1 (Dec. 2017) (Year: 2017).*
(Continued)

*Primary Examiner* — Intekhaab A Siddiquee
(74) *Attorney, Agent, or Firm* — Fish & Richardson P.C.

(57) ABSTRACT

This application provides a communication method and apparatus. One example method includes, obtaining, by a terminal device, a first frequency domain resource and a second frequency domain resource, wherein the first frequency domain resource and the second frequency domain resource are independently configured, and the second frequency domain resource comprises a control-resource set (CORESET) 0 and an initial bandwidth part (BWP); and receiving, by the terminal device, first information, wherein the first information is used to schedule a downlink data channel, the first information comprises frequency domain resource assignment information, wherein the frequency domain resource assignment information indicates a frequency domain resource of the downlink data channel within a range of the first frequency domain resource, and the first information is scrambled by using a group-radio network temporary identifier (G-RNTI) this application.

20 Claims, 9 Drawing Sheets

Network device 101

Terminal device

S101: Obtain a first frequency domain resource and a second frequency domain resource, where the first frequency domain resource and the second frequency domain resource are independently configured, and the second frequency domain resource includes a CORESET 0 and an initial BWP S102: Send first information, where the first information indicates a frequency domain resource of a downlink data channel within a range of the first frequency domain resource, and the first information is scrambled by using a G-RNTI

(56) References Cited

FOREIGN PATENT DOCUMENTS

| | | | | |
|---|---|---|---|---|
| WO | WO-2017045180 A1 * | 3/2017 | .............. | H04L 1/00 |
| WO | 2018231036 A1 | 12/2018 | | |
| WO | 2020027472 A1 | 2/2020 | | |
| WO | 2020040266 A1 | 2/2020 | | |

OTHER PUBLICATIONS

3GPP TS 38.214 V15.2.0, "3rd Generation Partnership Project; Technical Specification Group Radio Access Network; NR; Physical Layer Procedures for Data (Release 15)," Jun. 2018, 95 pages.
3GPP TS 38.214 V16.0.0, "3rd Generation Partnership Project; Technical Specification Group Radio Access Network; NR; Physical Layer Procedures for Data (Release 16)," Dec. 2019, 147 pages.
3GPP TS 38.211 V16.0.0, "3rd Generation Partnership Project; Technical Specification Group Radio Access Network; NR; Physical Channels and Modulation (Release 16)," Dec. 2019, 129 pages.
3GPP TS 38.321 V15.8.0, "3rd Generation Partnership Project; Technical Specification Group Radio Access Network; NR; Medium Access Control (MAC) Protocol Specification (Release 15)," Dec. 2019, 78 pages.
3GPP TS 38.212 V16.0.0, "3rd Generation Partnership Project; Technical Specification Group Radio Access Network; NR; Multiplexing and Channel Coding (Release 16)," Dec. 2019, 145 pages.
3GPP TS 38.213 V16.0.0, "3rd Generation Partnership Project; Technical Specification Group Radio Access Network; NR; Physical Layer Procedures for Control (Release 16)," Dec. 2019, 146 pages.
3GPP TS 38.331 V15.8.0, "3rd Generation Partnership Project; Technical Specification Group Radio Access Network; NR; Radio Resource Control (RRC) Protocol Specification (Release 15)," Dec. 2019, 532 pages.
International Search Report and Written Opinion in International Appln. No. PCT/CN2020/079063, mailed on Dec. 10, 2020, 14 pages (with English translation).
Extended European Search Report in European Appln No. 20924617.2, dated Feb. 16, 2023, 10 pages.
Office Action in Japanese Appln. No. 2022-554722, mailed on Oct. 24, 2023, 4 pages (with English translation).

* cited by examiner

FIG. 1

| Payload of first information | FDRA | TDRA | VRB-to-PRB mapping | MCS | Reserved bitwidth |
|---|---|---|---|---|---|

Antenna

1003

Radio frequency unit

1000

Memory 1002

Processor 1001

Input/Output apparatus 1004

COMMUNICATION METHOD AND APPARATUS

CROSS-REFERENCE TO RELATED APPLICATIONS

This application is a continuation of International Application No. PCT/CN2020/079063, filed on Mar. 12, 2020, the disclosure of which is hereby incorporated by reference in its entirety.

TECHNICAL FIELD

This application relates to the communication field, and in particular, to a communication method and apparatus.

BACKGROUND

In current mobile communication technologies, a physical downlink control channel (physical downlink control channel, PDCCH) may be used to carry downlink control information (downlink control information, DCI). A DCI format (format) 1_0 and a DCI format 1_1 may be used to schedule data, for example, indicate a frequency domain resource of a data channel by using DCI. A data channel is, for example, a physical downlink shared channel (physical downlink shared channel, PDSCH).

Currently, a length of a frequency domain resource assignment field in the DCI format 1_0 can be associated only with a control-resource set (control-resource set, CORESET) 0 or an initial bandwidth part (bandwidth part, BWP). Therefore, a frequency domain resource that can be indicated is limited. Therefore, currently, flexibility of indicating a frequency domain resource for multicast transmission needs to be improved.

SUMMARY

This application provides a communication method and apparatus, to improve flexibility of indicating a frequency domain resource for multicast transmission.

According to a first aspect, this application provides a communication method. The method may be performed by a terminal device or a chip in the terminal device.

According to the method, the terminal device obtains a first frequency domain resource and a second frequency domain resource. The terminal device receives first information, where the first information is scrambled by using a group-radio network temporary identifier (group-radio network temporary identifier, G-RNTI). The first information indicates a frequency domain resource of a data channel within a range of the first frequency domain resource, the first frequency domain resource and the second frequency domain resource are independently configured, and the second frequency domain resource includes a control-resource set (control-resource set, CORESET) 0 and an initial bandwidth part (bandwidth part, BWP).

According to the foregoing method, a multicast or broadcast data channel may be scheduled by using the first information. The first frequency domain resource that is associated with the first information is no longer associated with the CORESET 0 and/or the initial BWP that are/is configured by a network device. In other words, a size of the first frequency domain resource is not limited to the CORESET 0 or the initial BWP, and the first frequency domain resource may be flexibly configured. Herein, that a size of the first frequency domain resource is not limited to the CORESET 0 or the initial BWP may alternatively mean that the first frequency domain resource may be configured without reference to the CORESET 0 and/or the initial BWP. Therefore, flexibility of indicating a frequency domain resource for multicast transmission is improved.

In a possible example, the first information does not include an information field of at least one piece of information of a new data indicator, a redundancy version, a hybrid automatic repeat request (hybrid automatic repeat request, HARQ) process number, a downlink assignment index, a physical uplink control channel (physical uplink control channel, PUCCH) transmission power control command, a PUCCH resource indicator, or a PDSCH-to-HARQ feedback timing indicator. In addition, the first information may not include DCI format identifier information, in other words, the first information does not include an identifier for DCI formats information field, where the DCI format identifier information indicates an uplink DCI format or a downlink DCI format. The information field of the new data indicator may also be referred to as a new data indicator information field in this application, and information fields of other information are similar. Therefore, in the first information, a bitwidth in the foregoing information field may be used as a bitwidth in another information field, for example, indicates a frequency domain resource of a downlink data channel or indicates other information, to further improve scheduling flexibility.

For example, the terminal device may further receive second information, where the second information is in a DCI format 1_0, and the second information is scrambled by using a cell-radio network temporary identifier (cell-radio network temporary identifier, C-RNTI). For example, the second information may include an identifier for DCI formats, frequency domain resource assignment, time domain resource assignment, a virtual resource block (virtual resource block, VRB)-to-physical resource block (physical resource block, PRB) mapping (VRB-to-PRB mapping), a modulation and coding scheme, the new data indicator, the redundancy version, the HARQ process number, the downlink assignment index, the PUCCH transmission power control command, the PUCCH resource indicator, and the PDSCH-to-HARQ feedback timing indicator.

For example, a payload of the first information is the same as a payload of the second information; and/or a DCI format of the first information is the same as a DCI format of the second information.

In addition, a bitwidth that is in the first information and that corresponds to a first information field indicates the frequency domain resource of the downlink data channel in the first information, where the first information field is an information field in the second information. In this way, scheduling flexibility is further improved. For example, if the first information field occupies an $n_{th}$ bitwidth in the second information, an $n_{th}$ bitwidth indicates the frequency domain resource in the first information field, and n is a positive integer.

For example, the first information field may be an information field of at least one piece of information of the identifier for DCI formats, the new data indicator, the redundancy version, the HARQ process number, the downlink assignment index, the PUCCH transmission power control command, the PUCCH resource indicator, or the PDSCH-to-HARQ feedback timing indicator.

If the first information field is an information field of at least one piece of information of the new data indicator, the redundancy version, the HARQ process number, the downlink assignment index, the PUCCH transmission power control command, the PUCCH resource indicator, or the PDSCH-to-HARQ feedback timing indicator, the terminal device further receives third information from the network device. The third information indicates that the terminal device does not support an uplink HARQ feedback.

A size of a frequency domain resource information field in the first information may be associated with the first frequency domain resource. In other words, the size of the frequency domain resource information field in the first information is determined based on the first frequency domain resource.

According to a second aspect, this application provides a communication method. This method may be performed by a network device or a chip in the network device. The network device is, for example, a radio access network device such as a base station.

According to the method, the network device determines a first frequency domain resource and a second frequency domain resource, where the first frequency domain resource and the second frequency domain resource are independently configured, and the second frequency domain resource includes a CORESET 0 and an initial BWP. The network device further sends first information to a terminal device, where the first information is used to schedule a downlink data channel of the terminal device. The first information includes frequency domain resource assignment information, where the frequency domain resource assignment information indicates a frequency domain resource of the downlink data channel within a range of the first frequency domain resource. The first information is scrambled by using a G-RNTI.

In a possible example, the first information does not include an information field of at least one piece of information of a new data indicator, a redundancy version, a HARQ process number, a downlink assignment index, a PUCCH transmission power control command, a PUCCH resource indicator, or a PDSCH-to-HARQ feedback timing indicator. In addition, the first information may not include DCI format identifier information, in other words, the first information does not include an identifier for DCI formats information field, where the DCI format identifier information indicates an uplink DCI format or a downlink DCI format.

For example, the network device may further send second information to the terminal device. The second information is in a DCI format 1_0, and the second information is scrambled by using a C-RNTI. For example, the second information may include an identifier for DCI formats, frequency domain resource assignment, time domain resource assignment, a VRB-to-PRB mapping, a modulation and coding scheme, the new data indicator, the redundancy version, the HARQ process number, the downlink assignment index, the PUCCH transmission power control command, the PUCCH resource indicator, and the PDSCH-to-HARQ feedback timing indicator.

For example, a payload of the first information is the same as a payload of the second information; and/or a DCI format of the first information is the same as a DCI format of the second information.

In addition, a bitwidth that is in the first information and that corresponds to a first information field indicates the frequency domain resource of the downlink data channel in the first information, where the first information field is an information field in the second information. In this way, scheduling flexibility is further improved. For example, if the first information field occupies an $n_{th}$ bitwidth in the second information, an $n_{th}$ bitwidth indicates a frequency domain resource in the first information field, and n is a positive integer.

For example, the first information field is an information field of at least one piece of information of the identifier for DCI formats, the new data indicator, the redundancy version, the HARQ process number, the downlink assignment index, the PUCCH transmission power control command, the PUCCH resource indicator, or the PDSCH-to-HARQ feedback timing indicator.

If the first information field is an information field of at least one piece of information of the new data indicator, the redundancy version, the HARQ process number, the downlink assignment index, the PUCCH transmission power control command, the PUCCH resource indicator, or the PDSCH-to-HARQ feedback timing indicator, the network device further sends third information to the terminal device. The third information indicates that the terminal device does not support an uplink HARQ feedback.

A size of a frequency domain resource information field in the first information may be associated with the first frequency domain resource. In other words, the size of the frequency domain resource information field in the first information is determined based on the first frequency domain resource.

According to a third aspect, this application provides a communication apparatus. The communication apparatus may be configured to implement the functions in any one of the first aspect or the possible designs of the first aspect. The functions may be implemented by hardware, or may be implemented by hardware executing corresponding software. The hardware or the software includes one or more modules corresponding to the functions, the method steps, or the operations in any one of the first aspect and the designs of the first aspect. Specifically, the communication apparatus may be a terminal device or a chip in the terminal device.

In a possible example, the communication apparatus may include a communication module (or referred to as a communication unit) and a processing module (or referred to as a processing unit). The communication module may be used by the communication apparatus to perform communication, and the processing module may be used by the communication apparatus to implement a processing function of the communication apparatus.

The processing module may be configured to obtain a first frequency domain resource and a second frequency domain resource. The first frequency domain resource and the second frequency domain resource are independently configured, and the second frequency domain resource includes a CORESET 0 and an initial BWP. The communication module may be configured to receive first information, where the first information is used to schedule a downlink data channel. The first information includes frequency domain resource assignment information, where the frequency domain resource assignment information indicates a frequency domain resource of the downlink data channel within a range of the first frequency domain resource. The first information is scrambled by using a G-RNTI.

For example, the communication module may be further configured to receive second information, where the second information is in a DCI format 1_0, and the second information is scrambled by using a C-RNTI. For example, the second information may include an identifier for DCI formats, frequency domain resource assignment, time domain resource assignment, a VRB-to-PRB mapping, a modulation and coding scheme, a new data indicator, a redundancy version, a HARQ process number, a downlink assignment index, a PUCCH transmission power control command, a PUCCH resource indicator, and a PDSCH-to-HARQ feedback timing indicator.

The communication module may be further configured to receive third information from a network device. The third information indicates that the terminal device does not support an uplink HARQ feedback.

In another possible example, the communication apparatus may include a processor (or referred to as a processing chip or a processing circuit) and a transceiver (or referred to as a communication circuit). The processor may be configured to invoke program instructions, to perform a processing function of the communication apparatus. The communication module may be used by the communication apparatus to perform communication.

The processor may be configured to obtain a first frequency domain resource and a second frequency domain resource, where the first frequency domain resource and the second frequency domain resource are independently configured, and the second frequency domain resource includes a CORESET 0 and an initial BWP. The transceiver may be configured to receive first information, where the first information is used to schedule a downlink data channel. The first information includes frequency domain resource assignment information, where the frequency domain resource assignment information indicates a frequency domain resource of the downlink data channel within a range of the first frequency domain resource. The first information is scrambled by using a G-RNTI.

For example, the transceiver may be further configured to receive second information, where the second information is in a DCI format 1_0, and the second information is scrambled by using a C-RNTI. For example, the second information may include an identifier for DCI formats, frequency domain resource assignment, time domain resource assignment, a VRB-to-PRB mapping, a modulation and coding scheme, a new data indicator, a redundancy version, a HARQ process number, a downlink assignment index, a PUCCH transmission power control command, a PUCCH resource indicator, and a PDSCH-to-HARQ feedback timing indicator.

The transceiver may be further configured to receive third information from the network device. The third information indicates that the terminal device does not support an uplink HARQ feedback.

According to a fourth aspect, this application provides a communication apparatus. The communication apparatus may be configured to implement the functions in any one of the second aspect or the possible designs of the second aspect. The functions may be implemented by hardware, or may be implemented by hardware executing corresponding software. The hardware or the software includes one or more modules corresponding to the functions, the method steps, or the operations in any one of the second aspect and the designs of the second aspect. Specifically, the communication apparatus may be a network device or a chip in the network device.

In a possible example, the communication apparatus may include a communication module (or referred to as a communication unit) and a processing module (or referred to as a processing unit). The communication module may be used by the communication apparatus to perform communication, and the processing module may be used by the communication apparatus to implement a processing function of the communication apparatus.

The processing module may be configured to determine a first frequency domain resource and a second frequency domain resource, where the first frequency domain resource and the second frequency domain resource are independently configured, and the second frequency domain resource includes a CORESET 0 and an initial BWP. The communication module may be configured to send first information to a terminal device, where the first information is used to schedule a downlink data channel of the terminal device. The first information includes frequency domain resource assignment information, where the frequency domain resource assignment information indicates a frequency domain resource of the downlink data channel within a range of the first frequency domain resource. The first information is scrambled by using a G-RNTI.

For example, the communication module may be further configured to send second information to the terminal device, where the second information is in a DCI format 1_0, and the second information is scrambled by using a C-RNTI. For example, the second information may include an identifier for DCI formats, frequency domain resource assignment, time domain resource assignment, a VRB-to-PRB mapping, a modulation and coding scheme, a new data indicator, a redundancy version, a HARQ process number, a downlink assignment index, a PUCCH transmission power control command, a PUCCH resource indicator, and a PDSCH-to-HARQ feedback timing indicator.

The communication module may be further configured to send third information to the terminal device. The third information indicates that the terminal device does not support an uplink HARQ feedback.

In another possible example, the communication apparatus may include a processor (or referred to as a processing chip or a processing circuit) and a transceiver (or referred to as a communication circuit). The processor may be configured to invoke program instructions, to perform a processing function of the communication apparatus. The communication module may be used by the communication apparatus to perform communication.

The processor may be configured to determine a first frequency domain resource and a second frequency domain resource, where the first frequency domain resource and the second frequency domain resource are independently configured, and the second frequency domain resource includes a CORESET 0 and an initial BWP. The transceiver may be configured to send first information to the terminal device, where the first information is used to schedule a downlink data channel of the terminal device. The first information includes frequency domain resource assignment information, where the frequency domain resource assignment information indicates a frequency domain resource of the downlink data channel within a range of the first frequency domain resource. The first information is scrambled by using a G-RNTI.

For example, the transceiver may be further configured to send second information to the terminal device, where the second information is in a DCI format 1_0, and the second information is scrambled by using a C-RNTI. For example, the second information may include an identifier for DCI formats, frequency domain resource assignment, time domain resource assignment, a VRB-to-PRB mapping, a modulation and coding scheme, a new data indicator, a redundancy version, a HARQ process number, a downlink assignment index, a PUCCH transmission power control command, a PUCCH resource indicator, and a PDSCH-to-HARQ feedback timing indicator.

The transceiver may be further configured to send third information to the terminal device. The third information indicates that the terminal device does not support an uplink HARQ feedback.

According to a fifth aspect, this application provides a communication system. For example, the communication system may include a communication apparatus configured to implement any one of the first aspect or the possible designs of the first aspect, and a communication apparatus configured to implement any one of the second aspect or the possible designs of the second aspect. Specifically, the communication system may include the communication apparatus according to the third aspect and/or the communication apparatus according to the fourth aspect.

According to a sixth aspect, this application provides a computer storage medium, including program instructions. When the program instructions are run on a computer, the computer is enabled to perform the method in any one of the first aspect or the possible designs of the first aspect, or the method in any one of the second aspect or the possible designs of the second aspect.

According to a seventh aspect, embodiments of this application provide a computer program product. When the computer program product is executed on a computer, the computer is enabled to perform the method in any one of the first aspect or the possible designs of the first aspect, or the method in any one of the second aspect or the possible designs of the second aspect.

According to an eighth aspect, embodiments of this application provide a chip system. The chip system may include a processor, and may further include a memory (or the system chip is coupled to the memory). The chip system executes program instructions in the memory, to perform the method in any one of the first aspect or the possible designs of the first aspect, or the method in any one of the second aspect or the possible designs of the second aspect. “Coupling” means that two components are directly or indirectly combined with each other. For example, coupling may mean an electrical connection between the two components.

For beneficial effects of the methods shown in the second to the eighth aspects, refer to the beneficial effects of the corresponding method in the first aspect. Details are not described herein again for brevity.

BRIEF DESCRIPTION OF DRAWINGS

FIG. 1 is a schematic diagram of an architecture of a wireless communication system according to an embodiment of this application;

DESCRIPTION OF EMBODIMENTS

Figure 2:
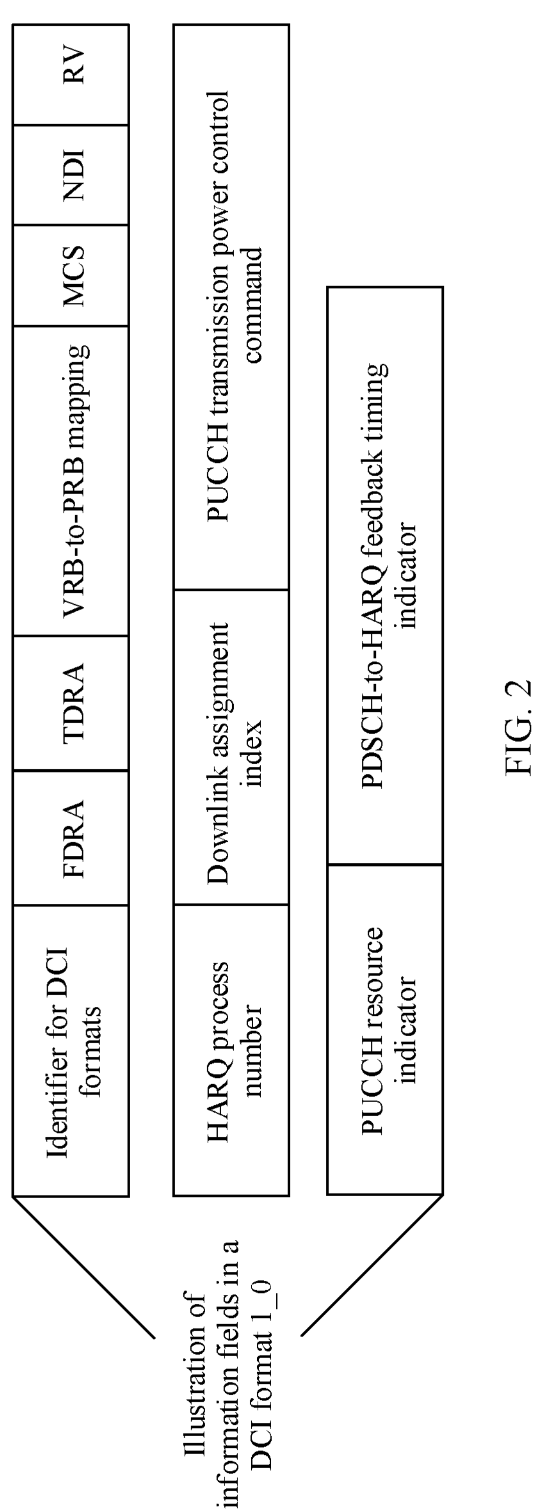
FIG. 2 is a schematic diagram of distribution of information fields in a DCI format 1_0 according to an embodiment of this application.

To improve flexibility of indicating a frequency domain resource for multicast transmission, this application provides a communication method. The following further describes in detail this application with reference to accompanying drawings. It should be understood that a specific operation method in a method embodiment described below may also be applied to an apparatus embodiment or a system embodiment.

Figure 1:
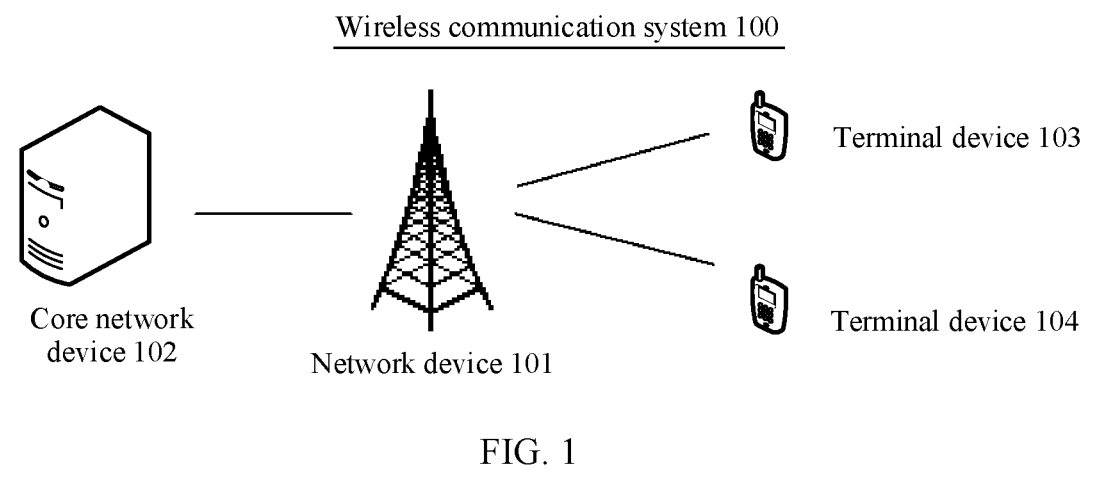

As shown in FIG. 1, the communication method provided in embodiments of this application may be applied to a wireless communication system 100.

The wireless communication system 100 may include a network device (or referred to as an access network device) 101, a core network device 102, and at least one terminal device (for example, a terminal device 103 and a terminal device 104 shown in FIG. 1). The terminal device may be connected to the network device 101 in a wireless manner, and the radio access network device is connected to the core network device 102 in a wireless or wired manner. The core network device 102 and the network device 101 may be different independent physical devices. In addition, functions of the core network device and logical functions of the radio access network device may be integrated into a same physical device, or some functions of the core network device and some functions of the radio access network device may be integrated into one physical device. For ease of description subsequently, the access network device may be referred to as the network device.

The terminal device may be located at a fixed position, or may be mobile. It should be understood that FIG. 1 is merely a schematic diagram of an architecture of a wireless communication system. The communication system provided in this application may further include another network device that is not shown in FIG. 1, for example, may further include a wireless relay device and a wireless backhaul device. A quantity of core network devices, a quantity of radio access network devices, and a quantity of terminal devices included in the mobile communication system are not limited in this embodiment of this application.

It should be understood that the foregoing wireless communication system 100 is usable in both a low-frequency scenario (sub 6 GHz) and a high-frequency scenario (above 6 GHz). An application scenario of the wireless communication system 100 includes but is not limited to a long term evolution (long term evolution, LTE) system, a new radio (new radio, NR) system in a 5th generation (5th generation, 5G) mobile communication system, a future mobile communication system, and the like.

As shown in FIG. 1, the network device 101 may be an access network device (or referred to as an access network site). The access network device is a device that provides a network access function, for example, a radio access network (radio access network, RAN) base station. The network device 101 may specifically include a base station (base station, BS), a radio resource management device configured to control the base station, and the like. The network device 101 may further include a relay station (a relay device), an access point, a base station in a future 5G network, a base station in a future evolved PLMN, an NR base station, or the like. The network device 101 may be a wearable device or a vehicle-mounted device. Alternatively, the network device 101 may be a chip having a communication module.

For example, the network device 101 includes but is not limited to a next generation NodeB (gNodeB, gNB) in 5G, an evolved NodeB (evolved NodeB, eNB) in an LTE system, a radio network controller (radio network controller, RNC), a radio controller in a CRAN system, a base station controller (base station controller, BSC), a home base station (for example, a home evolved NodeB, or a home NodeB, HNB), a baseband unit (baseband unit, BBU), a transmission reception point (transmission reception point, TRP), a transmission point (transmission point, TP), a mobile switching center, or the like. The network device 101 may further include a base station in a future 6G or later mobile communication system.

The core network device 102 is deployed on a core network side, and is mainly responsible for performing functions of a core network. The core network device 102 may be a core network element or a chip in the core network element in a 4G, 5G, or future wireless communication system.

The terminal device shown above may be user equipment (user equipment, UE), a terminal (terminal), an access terminal, a terminal unit, a terminal station, a mobile station (mobile station, MS), a remote station, a remote terminal, a mobile terminal (mobile terminal), a wireless communication device, a terminal agent, a terminal device, or the like. The terminal device may have a wireless transceiver function. The terminal device can perform communication (for example, wireless communication) with one or more network devices in one or more communication systems, and accepts network services provided by the network devices. The network devices herein include but are not limited to the network device 101 shown in the figure.

The terminal device may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device, another processing device connected to a wireless modem, a vehicle-mounted device, a wearable device, a terminal apparatus in a future 5G network, a terminal apparatus in a future evolved PLMN, or the like.

In addition, the terminal device may be deployed on land, where the deployment includes indoor or outdoor, or handheld or in-vehicle deployment, the terminal device may be deployed on water (for example, on a ship), or the terminal device may be deployed in air (for example, on an airplane, a balloon, or a satellite). The terminal device may be specifically a mobile phone (mobile phone), a tablet computer (pad), a computer that has a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. The terminal device may alternatively be a communication chip having a communication module, a vehicle having a communication function, a vehicle-mounted device (for example, an in-vehicle communication apparatus or an in-vehicle communication chip), or the like.

Currently, in NR, the terminal device may send and receive information in a bandwidth part (bandwidth part, BWP) configured by the network device 101. The terminal device may perform the following operations in a serving cell (serving cell) by using a higher layer parameter: BWP-downlink (BWP-Downlink) or higher-layer parameter: An initial downlink BWP (initial downlink BWP) is configured with a maximum of four downlink BWPs. Usually, for one terminal device, only one BWP can be in an active state at a same moment, the activated BWP is referred to as an active BWP (active BWP), and the terminal device can send and receive information only in the active BWP.

Specifically, downlink BWP types include an initial BWP (initial BWP), a dedicated BWP (dedicated BWP), and a default BWP (default BWP). The initial BWP is a BWP configured by the terminal device in an initial access phase, and the initial BWP is configured by using system information. Therefore, for terminal devices in a same cell, initial BWPs are the same. The initial downlink BWP is used to transmit PDSCHs of remaining minimum system information (remaining minimum system information, RMSI), an msg2, an msg4, and other signaling. The dedicated BWP is a BWP configured when UE is in a radio resource control (radio resource control, RRC) connected mode, and can be used only by the terminal device to send and receive information.

It should be understood that sending and receiving information in this application includes but is not limited to sending and receiving signaling and data.

In addition, each downlink BWP includes at least one control-resource set (control-resource set, CORESET) having a dedicated search space.

Each CORESET may include a plurality of physical resource blocks in frequency domain, and the CORESET includes one to three OFDM symbols in time domain. These OFDM symbols may be located at any location in a slot. Time-frequency resources occupied by the CORESET are semi-statically configured by using higher-layer parameters. In frequency domain, the CORESET configuration supports continuous and discrete frequency domain resource configurations, and the configured CORESET does not exceed a frequency domain range of an active BWP. A quantity of resource blocks (resource blocks, RBs) in a CORESET 0 is indicated by the system information. Therefore, for terminal devices in a same cell, CORESETs 0 are the same.

When there are a plurality of terminal devices shown in FIG. 1, the network device 101 may perform transmission to the plurality of terminal devices through multicast transmission. It should be understood that multicast transmission includes but is not limited to groupcast transmission and/or broadcast transmission. During multicast transmission, the network device 101 sends one piece of downlink control information to a plurality of terminal devices in a cell (which may be all or some terminal devices in the cell), to indicate these terminal devices to receive PDSCHs on a same frequency domain resource. Correspondingly, the terminal devices may send and receive information on the frequency domain resource corresponding to an active BWP. A dedicated BWP of each terminal device is independently configured. Therefore, multicast transmission needs to be performed on a frequency domain resource common to all target terminals.

In an implementation, the terminal device can detect only one DCI format, namely, a DCI format 1_0, in a common search space. In this application, the DCI format 1_0 may indicate DCI in the DCI format 1_0. It should be understood that the DCI format 1_0 may be scrambled by using a plurality of radio network temporary identifiers (radio network temporary identity, RNTI) to indicate different information. In an embodiment, quantities of bits carried in DCI formats 1_0 scrambled by using different RNTIs are usually the same.

As shown in FIG. 2, when a cyclic redundancy check (cyclic redundancy check, CRC) of the DCI format 1_0 is scrambled by using a cell-radio network temporary identifier (cell-radio network temporary identifier, C-RNTI), an example of distribution of information fields in the DCI format 1_0 is shown in FIG. 2. It should be understood that the information fields shown in FIG. 2 are arranged in a linear manner rather than in an array manner. It should be understood that FIG. 2 is merely a schematic diagram. In a specific DCI transmission process, a receiver receives/obtains information about each field in DCI based on a predetermined location or an arrangement.

It can be learned that the DCI format 1_0 may include the following information fields:

An identifier for DCI formats (identifier for DCI formats) information field indicates a DCI format. For example, the identifier for DCI formats information field includes one bitwidth. If the bitwidth is set to 1, the bit identifies a downlink DCI format. If the bitwidth is set to 0, the bit identifies an uplink DCI format.

A frequency domain resource assignment (frequency domain resource assignment, FDRA) information field indicates a frequency domain resource occupied for data channel transmission, for example, indicate a start position (for example, a start RB) and a width (for example, a quantity of RBs of the frequency domain resource) of the frequency domain resource.

A time domain resource assignment (time domain resource assignment, TDRA) information field indicates a time domain resource occupied for the data channel transmission.

A virtual resource block (virtual resource block, VRB)-to-physical resource block (physical resource block, PRB) mapping (VRB-to-PRB mapping) information field indicates whether the VRB-to-PRB mapping is interleaved or non-interleaved.

A modulation and coding scheme (modulation and coding scheme, MCS) information field indicates a modulation order and a bit rate that are used on a data channel.

A new data indicator (new data indicator, NDI) information field is used to identify initial transmission (or referred to as initial transmission). A bit in this information field is not reversed during retransmission and is reversed during the initial transmission. For example, a bitwidth of an initially transmitted NDI information field of a data packet is set to 1, and bitwidths of an NDI information field that is in DCI that is retransmitted for three times are all 1. If data transmitted next time is an initially transmitted data packet, a bitwidth of an NDI information field in the DCI is reversed to 0.

A redundancy version (redundancy version, RV) information field indicates an RV of a scheduled data channel. For example, redundant bits generated by an encoder are divided into several groups, each RV defines a transmission start point, and different RVs are separately used for the first transmission and each HARQ retransmission, to implement gradual accumulation of the redundant bits and complete an incremental redundant HARQ operation.

A HARQ process number (HARQ process number, HPN) information field indicates a HARQ process number of data.

A downlink assignment index (downlink assignment index) information field indicates a serial number of a data channel fed back in a codebook during dynamic codebook construction.

A transmission power control (transmission power control, TPC) command for PUCCH (TPC command for scheduled PUCCH) information field is used to adjust, when HARQ feedback information needs to be sent on a data channel scheduled by using DCI, power of a PUCCH that carries the HARQ feedback information.

A PUCCH resource indicator (PUCCH resource indicator) information field indicates, when HARQ feedback information needs to be sent on a data channel scheduled by using DCI, a resource of a PUCCH that carries the feedback information HARQ.

A PDSCH-to-HARQ feedback timing indicator (PDSCH-to-HARQ feedback timing indicator) information field (which may be referred to as a K1 information field), when feedback information HARQ needs to be sent on a data channel scheduled by using DCI, indicates an offset, from a slot in which the data channel scheduled by using the DCI is located to a slot in which a channel carrying a HARQ corresponding to a PDSCH is located (which may be referred to as PDSCH-to-HARQ feedback timing below).

It should be understood that, in this application, an information field may be a bitwidth included in the information field, or the information field may be information corresponding to the information field, for example, a value of the bitwidth included in the information field and/or information represented by the value of the bitwidth. For example, the identifier for DCI formats information field may be a bitwidth corresponding to the identifier for DCI formats information field, or the identifier for DCI formats information field may be a value of the bitwidth and/or information represented by the value of the bitwidth.

The structure shown in FIG. 2 is merely an example for description, and it should not be understood that the DCI shown in this application is limited to the structure shown in FIG. 2. For example, when the CRC of the DCI format 1_0 is scrambled by using a system information-radio network temporary identifier (system information-radio network temporary identifier, SI-RNTI), the DCI format 1_0 may include a frequency domain resource assignment information field, a time domain resource assignment information field, a VRB-to-PRB mapping information field, a modulation and coding scheme information field, a system information indicator (system information indicator) information field, and a reserved (reserved) bit (or referred to as a reserved bitwidth). Herein, the scrambling may alternatively be performed by using another identifier. In addition, sizes of the information fields shown in FIG. 2 do not represent actual lengths of the information fields in the DCI (namely, quantities of bitwidths included in the information fields).

A size of the frequency domain resource assignment information field (namely, a quantity of bitwidths included in the frequency domain resource assignment information field) in the DCI format 1_0 is determined based on a frequency domain width corresponding to a CORESET 0 or an initial BWP. This means that a frequency domain resource for multicast transmission according to a conventional technology can only be the CORESET 0 or the initial BWP. Therefore, flexibility of scheduling a frequency domain resource during multicast transmission is affected.

Based on the architecture shown in FIG. 1, the communication method provided in embodiments of this application may be performed by the network device 101 and at least one terminal device, to improve the flexibility of scheduling a frequency domain resource during multicast transmission. The terminal devices may include the terminal device 103, the terminal 104, and/or another terminal device that is not shown in FIG. 1. The method may include the following steps shown in FIG. 3.

S101: The terminal device obtains a first frequency domain resource.

Specifically, the terminal device may obtain a start RB and a frequency domain width of the first frequency domain resource by using system information or a higher layer parameter.

In a specific example, the terminal device may obtain the first frequency domain resource by using the system information or RRC signaling. Optionally, the frequency domain resource is a first BWP. In addition, the first frequency domain resource may alternatively be dynamically indicated by using DCI. Specifically, the system information, the RRC signaling, or the DCI may indicate at least one of an index (for example, a BWP identifier) of the first BWP, a start position of the first frequency domain resource, the frequency domain width of the first frequency domain resource, or a numerology (numerology) of the first frequency domain resource. The numerology of the first frequency domain resource includes a subcarrier spacing (subcarrier spacing, SCS) and a cyclic prefix (cyclic prefix, CP).

In another example, the first frequency domain resource is a subset or a proper subset of a third frequency domain resource. The third frequency domain resource is an active BWP. The terminal device may obtain the third frequency domain resource by using system information or RRC signaling.

In an embodiment, the terminal device further obtains a second frequency domain resource. The first frequency domain resource and the second frequency domain resource are independently configured. In other words, the first frequency domain resource does not depend on a configuration of the second frequency domain resource.

In a possible example, that the first frequency domain resource and the second frequency domain resource are independently configured may mean that the first frequency domain resource and the second frequency domain resource are configured by using different signaling, or may mean that the first frequency domain resource and the second frequency domain resource are configured by using different fields in same signaling. In a further optional embodiment, configurations of the different signaling are not mutually referenced, or configurations of the different fields are not mutually referenced.

For example, the second frequency domain resource may be configured by the network device 101 by using system information, and the first frequency domain resource may be configured by the network device 101 by using higher layer signaling. For another example, the first frequency domain resource is configured by using first RRC signaling, and the second frequency domain resource is configured by using second RRC signaling. A frequency domain width of the second frequency domain resource is a quantity of PRBs corresponding to a CORESET 0, and the CORESET 0 is configured by using system information. Alternatively, the frequency domain width of the second frequency domain resource is an initial BWP, and the initial BWP is configured by using system information or a higher layer parameter. Alternatively, the frequency domain width of the second frequency domain resource is a predefined BWP or a predefined frequency domain width.

In another possible example, that the first frequency domain resource and the second frequency domain resource are independently configured may mean that the first frequency domain resource is configured without reference to the second frequency domain resource. For example, the frequency domain width of the first frequency domain resource is unrelated to the frequency domain width of the second frequency domain resource, and/or the start position of the first frequency domain resource is unrelated to a start position of the second frequency domain resource. During implementation, a first parameter used to configure the first frequency domain resource may be determined without reference to a second parameter, and the second parameter is used to configure the second frequency domain resource. The first parameter may be a direct parameter used to determine the first frequency domain resource. For example, the first parameter includes the first frequency domain resource. Alternatively, the first parameter may be an indirect parameter used to determine the first frequency domain resource. For example, the first parameter includes a resource indication value (resource indication value, RIV) and/or another parameter used to configure the frequency domain resource. Similarly, the second parameter may be a direct parameter or an indirect parameter used to determine the second frequency domain resource.

A specific example is used for description herein. If the second frequency domain resource includes the CORESET 0, and the CORESET 0 is determined based on a parameter A, first information may include a parameter B, and the parameter B is determined without reference to the parameter A. If the second frequency domain resource includes the initial BWP, and the initial BWP is determined based on a parameter C, the first information may include the parameter B, and the parameter B is determined without reference to the parameter C. If the second frequency domain resource includes the CORESET 0 and the initial BWP, where the CORESET 0 is determined based on the parameter A, and the initial BWP is determined based on the parameter C, the first information may include the parameter B, the parameter B is determined without reference to the parameter A, and the parameter B is determined without reference to the parameter C.

The following describes possible configuration manners of the first frequency domain resource and the second frequency domain resource by using examples.

In a possible configuration manner, the start position of the first frequency domain resource and the start position of the second frequency domain resource are independent of each other and are not mutually referenced. In addition, the frequency domain width of the first frequency domain resource and the frequency domain width of the second frequency domain resource are independent of each other and are not mutually referenced.

Figure 4:
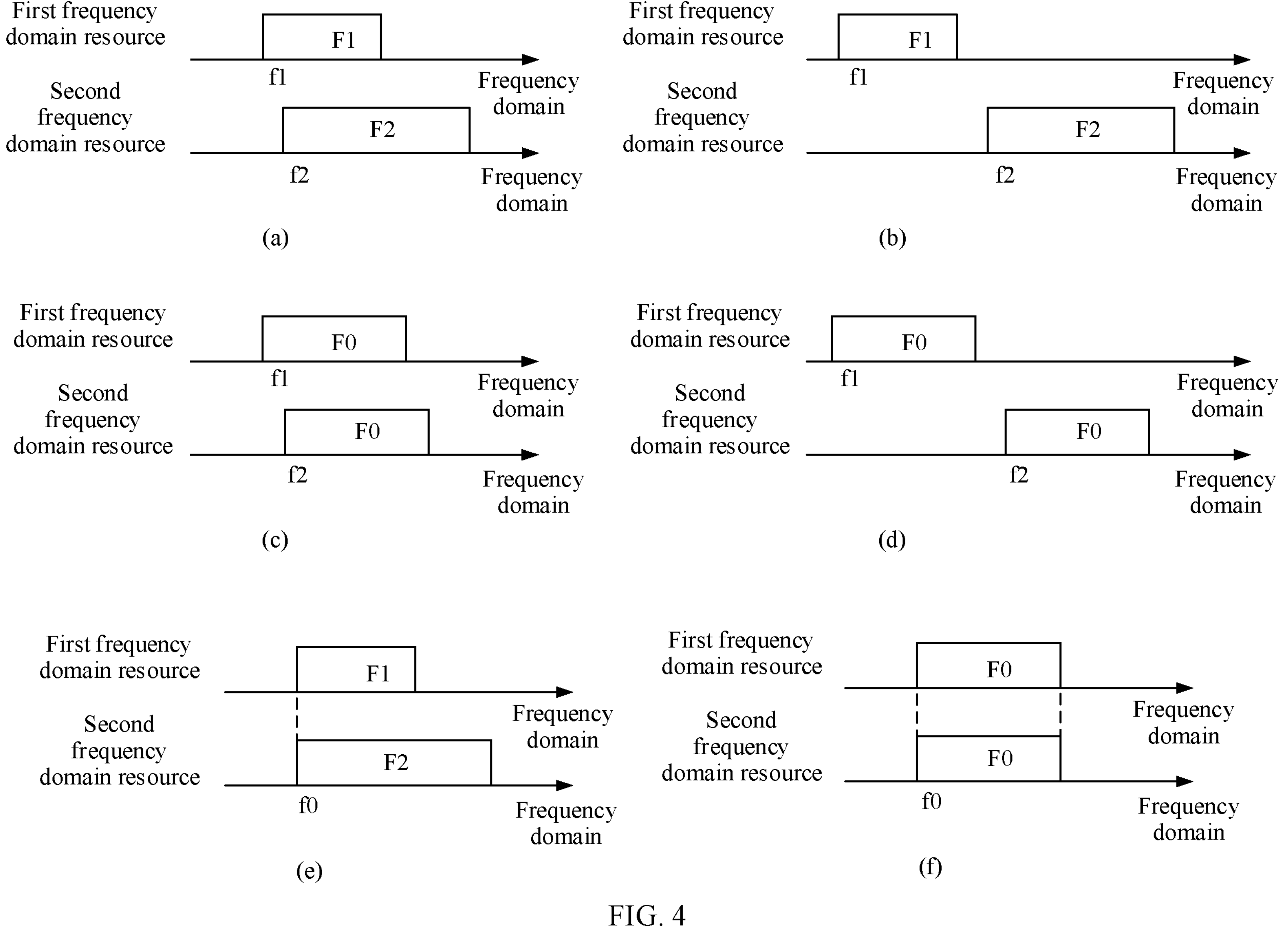
FIG. 4 is a schematic diagram of a relationship between a first frequency domain resource and a second frequency domain resource according to an embodiment of this application.

For example, as shown in numbers (a) and (b) in FIG. 4, a frequency-domain start position of the first frequency domain resource is f1, a start position of the second frequency domain resource is f2, f1 is not equal to f2, and f1 is determined without reference to f2. A frequency domain width of the first frequency domain resource is F1, a frequency domain width of the second frequency domain resource is F2, F1 is not equal to F2, and F1 is determined without reference to F2.

In another possible configuration manner, the start position of the first frequency domain resource and the start position of the second frequency domain resource are independent of each other and are not mutually referenced. In addition, the frequency domain width of the first frequency domain resource may be determined with reference to the frequency domain width of the second frequency domain resource. For example, the frequency domain width of the first frequency domain resource is set based on the frequency domain width of the second frequency domain resource. For example, the width of the first frequency domain resource is set to be equal to the frequency domain width of the second frequency domain resource, or there is a multiple relationship between the frequency domain width of the first frequency domain resource and the frequency domain width of the second frequency domain resource.

For example, as shown in numbers (c) and (d) in FIG. 4, a frequency-domain start position of the first frequency domain resource is f1, a start position of the second frequency domain resource is f2, f1 is not equal to f2, and f1 is determined without reference to f2. A frequency domain width of the first frequency domain resource is set to be the same as a frequency domain width of the second frequency domain resource, for example, both are F0.

In another possible configuration manner, the frequency domain width of the first frequency domain resource and the frequency domain width of the second frequency domain resource are independent of each other and are not mutually referenced. In addition, the start position of the first frequency domain resource may be determined with reference to the start position of the second frequency domain resource. For example, the start position of the first frequency domain resource is set based on the start position of the second frequency domain resource. For example, the start position of the first frequency domain resource is set to be equal to the start position of the second frequency domain resource, or there is a multiple relationship between the frequency domain width of the first frequency domain resource and the frequency domain width of the second frequency domain resource.

For example, as shown in a number (e) in FIG. 4, a frequency domain width of the first frequency domain resource is F1, a frequency domain width of the second frequency domain resource is F2, F1 is not equal to F2, and F1 is determined without reference to F2. A start position of the first frequency domain resource is set to be the same as a start position of the second frequency domain resource, and both are f0.

In addition, the start position of the first frequency domain resource may be the same as the start position of the second frequency domain resource, and the frequency domain width of the first frequency domain resource may be the same as the frequency domain width of the second frequency domain resource. The start position of the first frequency domain resource is determined without reference to the start position of the second frequency domain resource, and the frequency domain width of the first frequency domain resource is determined without reference to the frequency domain width of the second frequency domain resource. As shown in a number (f) in FIG. 4, both a frequency-domain start position of the first frequency domain resource and a start position of the second frequency domain resource are f0. Both a frequency domain width of the first frequency domain resource and a frequency domain width of the second frequency domain resource are F0.

In another example, that the first frequency domain resource and the second frequency domain resource are independently configured may mean that a parameter that is of a frequency domain resource and that is configured by the network device for a first frequency domain is sufficient to determine the first frequency domain resource, and/or a parameter that is of a frequency domain resource and that is configured by the network device for a second frequency domain is sufficient to determine the second frequency domain resource.

It should be understood that the foregoing manners of independently configuring the first frequency domain resource and the second frequency domain resource are merely examples for description. According to a general understanding of a person skilled in the art, any one of the foregoing manners may be combined for implementation. To be specific, the first frequency domain resource and the second frequency domain resource are configured by using independent signaling, the first frequency domain resource and the second frequency domain resource are not mutually referenced, and/or the parameter that is of the frequency domain resource and that is configured for the second frequency domain is sufficient to determine the second frequency domain resource.

Further, the second frequency domain resource may include the CORESET 0 and the initial BWP. The CORESET 0 and/or the initial BWP may be configured by using system information or RRC signaling. The CORESET 0 indicates a control-resource set whose index number is 0. Specifically, UE determines, by using a master information block (master information block, MIB), a control-resource set used for a type-0 PDCCH common search space set. A quantity of consecutive resource blocks in the control-resource set of the type-0 PDCCH common search space set, namely, a frequency domain width corresponding to the CORESET 0, is obtained by using a parameter controlResourceSetZero in system information pdcch-ConfigSIB1 or a higher layer parameter PDCCH-ConfigCommon. The UE obtains an initial downlink BWP by using a higher layer parameter initialDownlinkBWP. If the UE does not obtain the higher layer parameter initialDownlinkBWP, the frequency domain width of the second frequency domain resource is determined by the CORESET 0. To be specific, if the UE does not obtain the higher layer parameter initialDownlinkBWP, the initial downlink BWP is defined as a group of consecutive PRBs. A start PRB is a PRB having a smallest index number in the control-resource set of the type-0 PDCCH common search space set, and an end PRB is a PRB having a largest index number in the control-resource set of the type-0 PDCCH common search space set.

It should be understood that the start position of the first frequency domain resource may be the same as or different from the start position of the second frequency domain resource. In addition, the frequency domain width of the first frequency domain resource may be the same as or different from the frequency domain width of the second frequency domain resource. An index number of an RB corresponding to the start position of the first frequency domain resource may be greater than an index number of an RB corresponding to the start position of the second frequency domain resource, or the index number of the RB corresponding to the start position of the first frequency domain resource may be less than the index number of the RB corresponding to the start position of the second frequency domain resource. In addition, the frequency domain width of the first frequency domain resource may be greater than the frequency domain width of the second frequency domain resource, or the frequency domain width of the first frequency domain resource may be less than the frequency domain width of the second frequency domain resource.

For example, a relationship between the first frequency domain resource and the second frequency domain resource is shown in any one of numbers (a), (b), (c), (d), (e), or (f) in FIG. 4. As shown in the numbers (a) and (b), the frequency-domain start position of the first frequency domain resource is f1, the start position of the second frequency domain resource is f2, and f1 is not equal to f2. The frequency domain width of the first frequency domain resource is F1, the frequency domain width of the second frequency domain resource is F2, and F1 is not equal to F2. The first frequency domain resource and the second frequency domain resource shown in the number (a) overlap in frequency domain, and the first frequency domain resource and the second frequency domain resource shown in the number (b) do not overlap in frequency domain. As shown in the numbers (c) and (d), the frequency-domain start position of the first frequency domain resource is f1, the start position of the second frequency domain resource is f2, and f1 is not equal to f2. Both the frequency domain width of the first frequency domain resource and the frequency domain width of the second frequency domain resource are F0. The first frequency domain resource and the second frequency domain resource shown in the number (c) overlap in frequency domain, and the first frequency domain resource and the second frequency domain resource shown in the number (d) do not overlap in frequency domain. As shown in the number (e), both the frequency-domain start position of the first frequency domain resource and the start position of the second frequency domain resource are f0. The frequency domain width of the first frequency domain resource is F1, the frequency domain width of the second frequency domain resource is F2, and F1 is not equal to F2. As shown in the number (f), both the frequency-domain start position of the first frequency domain resource and the start position of the second frequency domain resource are f0. Both the frequency domain width of the first frequency domain resource and the frequency domain width of the second frequency domain resource are F0.

S102: The network device sends the first information to the terminal device, where the first information is used to schedule a downlink data channel.

The first information includes frequency domain resource assignment information. Optionally, the frequency domain resource assignment information indicates a frequency domain resource of the downlink data channel within a range of the first frequency domain resource. In an embodiment, the frequency domain resource assignment information may be a resource indication value (represented by a RIV in the following formula), and the resource indication value may meet an association relationship between a start RB of a PDSCH and a quantity of consecutive RBs.

It is assumed that the start RB of the PDSCH (represented by RBstart in the following formula) and the quantity of consecutive RBs (represented by LRBs in the following formula) meet the following formula:

$$(L_{RBs}-1)\leq\lfloor N_{BWP}^{size}/2\rfloor; \quad \text{(Formula 1)}$$

In this case, the resource indication value meets the following formula:

$$RIV=N_{BWP}^{size}(L_{RBs}-1)+RB_{start}; \quad \text{(Formula 2)}$$

Otherwise, if the start RB of the PDSCH and the quantity of consecutive RBs do not meet Formula 1, the RIV meets the following formula:

$$RIV=N_{BWP}^{size}\left(N_{BWP}^{size}-L_{RBs}+1\right)+\left(N_{BWP}^{size}-1-RB_{start}\right); \quad \text{(Formula 3)}$$

$L_{RBs}\geq 1$ and does not exceed $$N_{BWP}^{size}-RB_{start}.\ N_{BWP}^{size}$$

is a quantity of resource blocks of a first time domain resource.

The start RB of the PDSCH may be represented as an offset between a minimum RB corresponding to the PDSCH and a minimum RB of the first frequency domain resource.

For example, the first information is scrambled by using a G-RNTI. To be specific, the first information is sent to one or more terminal devices including the terminal device, and a data channel scheduled by using the first information is transmitted in a multicast or broadcast manner. It should be understood that the frequency domain resource assignment information may alternatively explicitly indicate the frequency domain resource, or may implicitly indicate the frequency domain resource by using an association relationship between some parameters and a frequency domain. In some embodiments, the allocated frequency domain resources are not limited to or are not limited to the range of the first frequency domain resource. The terminal device may directly obtain information about the frequency domain resource and then directly use the frequency domain resource in subsequent communication; or the terminal device may obtain the first information, and then determine a frequency domain resource finally to-be-used in a subsequent communication process according to a preset rule and based on the obtained first frequency domain resource.

Correspondingly, the terminal device receives the first information.

According to the foregoing method, the multicast or broadcast data channel may be scheduled by using the first information. The first frequency domain resource that is associated with the first information is no longer associated with the CORESET 0 and/or the initial BWP that are/is configured by the network device 101. In other words, a size of the first frequency domain resource is not limited to the CORESET 0 or the initial BWP, and the first frequency domain resource may be flexibly configured. Herein, that the size of the first frequency domain resource is not limited to the CORESET 0 or the initial BWP may alternatively mean that the first frequency domain resource may be configured without reference to the CORESET 0 and/or the initial BWP. Therefore, flexibility of indicating a frequency domain resource for multicast transmission is improved.

The following provides one or more specific examples of the first information. It should be understood that the following designs of the first information may be combined with the foregoing embodiment, or may be separately used as a plurality of embodiments. For example, the first information is DCI.

For example, the first information does not include a first information field. The first information field may include an identifier for DCI formats information field. In addition, the first information field may include at least one of a new data indicator information field, a redundancy version information field, a HARQ process number information field, a downlink assignment index information field, a PUCCH transmission power control command information field, a PUCCH resource indicator information field, or a PDSCH-to-HARQ feedback timing indicator information field. In an embodiment, the first information field may further include at least one of a virtual resource block-to-physical resource block mapping information field and a modulation and coding scheme information field. Therefore, in the first information, a bitwidth corresponding to the first information field may be used as a bitwidth in another information field, for example, indicates the frequency domain resource of the downlink data channel, to further improve flexibility of indicating a frequency domain resource.

It should be understood that the bitwidth that is in the first information and that corresponds to the first information field, which is also referred to as the bitwidth that is in the first information and that corresponds to the first information field, indicates a bitwidth that is in the first information and whose sequence number is the same as a sequence number of a bitwidth occupied by the first information field in second information in this application. For example, if in the second information, an $n_{th}$ bitwidth is the bitwidth occupied by the first information field. In the first information, an $n_{th}$ bitwidth may be considered as the bitwidth that is in the first information and that corresponds to the first information field. n is a positive integer.

During implementation, optionally, the network device 101 may further send the second information to the terminal device. The second information may be scrambled by using a C-RNTI or another RNTI. For example, an information field in the second information may include, as shown in FIG. 2, the identifier for DCI formats information field, the frequency domain resource assignment information field, the time domain resource assignment information field, the VRB-to-PRB mapping information field, the modulation and coding scheme information field, the new data indicator information field, the redundancy version information field, the HARQ process number information field, the downlink assignment index information field, the PUCCH transmission power control command information field, the PUCCH resource indicator information field, and the PDSCH-to-HARQ feedback timing indicator information field. A size of the frequency domain resource assignment information field in the second information is determined based on the CORESET 0 or the initial BWP.

For example, a size l of the frequency domain resource assignment information field in the second information meets the following formula:

$$l = \lceil \log_2(N_{RB}^{DL,BWP}(N_{RB}^{DL,BWP}+1)/2) \rceil; \quad \text{(Formula 4)}$$

$\lceil\ \rceil$ represents ceiling.

$N_{RB}^{DL,BWP}$ represents a width of the CORESET 0 or a width of the initial BWP. For example, the width of the CORESET 0 is 24 RBs, 48 RBs, or 96 RBs.

It should be understood that the second information may be in a DCI format 1_0. In an embodiment, a bit quantity of the second information is the same as that of the first information.

Figures 5, 6:
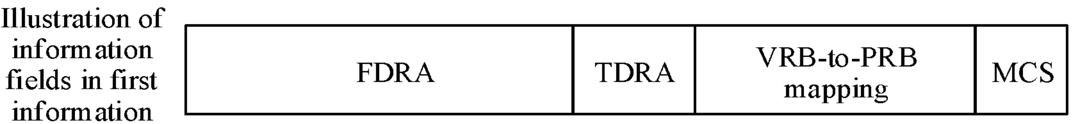
FIG. 5 is a schematic diagram of distribution of information fields in first information according to an embodiment of this application.
FIG. 6 is another schematic diagram of distribution of information fields in first information according to an embodiment of this application.

As shown in FIG. 5, in an embodiment, the first information includes a frequency domain resource assignment information field, a time domain resource assignment information field, a VRB-to-PRB mapping information field, a modulation and coding scheme information field, and a reserved bitwidth. In another embodiment, information fields in the first information in this application may include a frequency domain resource assignment information field, a time domain resource assignment information field, a VRB-to-PRB mapping information field, and a modulation and coding scheme information field.

Further, as shown in FIG. 5, a bitwidth occupied by the first information field in the second information indicates frequency domain resource assignment in the first information, or the bitwidth is a bit field corresponding to the FDRA information field in the first information. In other words, the bitwidth occupied by the first information field in the second information is included in the FDRA information field, so that a size of the FDRA information field is increased, as shown in FIG. 6, or a quantity of bitwidths included in the FDRA information field is increased, to implement more flexibility of indicating a frequency domain resource. In addition, the first information field may include at least one of an identifier for DCI formats information field, a new data indicator information field, a redundancy version information field, a HARQ process number information field, a downlink assignment index information field, a PUCCH transmission power control command information field, a PUCCH resource indicator information field, or a PDSCH-to-HARQ feedback timing indicator information field.

For example, the first bitwidth in the second information is a bitwidth occupied by the identifier for DCI formats information field, the first information does not include the identifier for DCI formats information field, and the first bitwidth indicates the frequency domain resource assignment.

For another example, an $m_{th}$ bitwidth in the second information is the new data indicator information field, the first information does not include the new data indicator information field, and the $m_{th}$ bitwidth indicates the frequency domain resource assignment. m is a positive integer.

For another example, an $a_{th}$ bitwidth and a $b_{th}$ bitwidth in the second information is the downlink assignment index information field, the first information does not include the downlink assignment index information field, and the $a_{th}$ bitwidth and the $b_{th}$ bitwidth indicate the frequency domain resource assignment. a and b are positive integers, and $a \le b$.

Optionally, a payload of the first information shown in FIG. 5 is the same as a payload of the second information. For example, both the payload of the first information shown in FIG. 5 and the payload of the second information are l+28 bits. l represents a bit quantity of the frequency domain resource assignment information field in the second information, and the bit quantity in the frequency domain resource assignment information field is determined based on the width of the CORESET 0 and the initial BWP or a quantity of consecutive resource blocks, as shown in Formula 4. 28 represents a sum of bit quantities in all information fields except the frequency domain resource assignment information field in the second information. To ensure that the payload of the first information is the same as the payload of the second information, as shown in FIG. 6, several reserved bitwidths need to be added to the first information. In this case, the information fields in the first information may include the FDRA information field, the TDRA information field, the VRB-to-PRB mapping information field, and the reserved bitwidth.

For example, a size $L_0$ of the reserved bitwidth in the first information shown in FIG. 6 meets the following Formula 5:

$$L_0 = 28 + l - L - + \sum_{i=1}^{N} L_i; \quad \text{(Formula 5)}$$

$$\sum_{i=1}^{N} L_i$$

represents a sum of bit quantities in all information fields except the frequency domain resource assignment information field in the first information.

For example, $$\sum_{i=1}^{N} L_i$$

includes but is not limited to: $L_1$ is a quantity of bitwidths occupied by the time domain resource assignment information field, for example, $L_1=4$; $L_2$ is a quantity of bitwidths occupied by the modulation and coding scheme information field, for example, $L_2=5$; and $L_3$ is a quantity of bitwidths occupied by the VRB-to-PRB mapping information field, for example, $L_3=1$.

For another example, $$\sum_{i=1}^{N} L_i$$

includes but is not limited to: $L_1$ is a quantity of bitwidths occupied by the time domain resource assignment information field, for example, $L_1=4$; $L_2$ is a quantity of bitwidths occupied by the modulation and coding scheme information field, for example, $L_2=5$; $L_3$ is a quantity of bitwidths occupied by the VRB-to-PRB mapping information field, for example, $L_3=1$; and $L_4$ is a quantity of bitwidths occupied by the new data indicator information field, for example, $L_4=1$. $L_5$ is a quantity of bitwidths occupied by the redundancy version information field, for example, $L_5=2$. $L_6$ is a quantity of bitwidths occupied by the HARQ process number information field, for example, $L_6=4$. $L_7$ is a quantity of bitwidths occupied by the downlink assignment index information field, for example, $L_7=2$. $L_8$ is a quantity of bitwidths occupied by the PUCCH transmission power control command information field, for example, $L_8=2$. $L_9$ is a quantity of bitwidths occupied by the PUCCH resource indicator information field, for example, $L_9=3$. $L_{10}$ is a quantity of bitwidths occupied by the PDSCH-to-HARQ feedback timing indicator information field, for example, $L_{10}=3$.

Optionally, the reserved bit $L_0$ may be equal to 0.

Optionally, as shown in FIG. 5 and/or FIG. 6, a size of the frequency domain resource assignment information field in the first information is associated with the first frequency domain resource. In other words, the size of the frequency domain resource assignment information field in the first information is determined based on the first frequency domain resource. For example, the size of the frequency domain resource assignment information field in the first information is determined based on the width of the first frequency domain resource (for example, a quantity of RBs of the first frequency domain resource). That the frequency domain resource assignment information field includes L bitwidths meets the following Formula 6:

$$L = \left\lceil \log_2\left(N_{RB}^{g}\left(N_{RB}^{g}+1\right)/2\right) \right\rceil; \quad \text{(Formula 6)}$$

$\lceil\ \rceil$ represents ceiling.

$$N_{RB}^{g}$$

represents the width of the first frequency domain resource.

Optionally, a format of the first information shown in FIG. 5 and/or FIG. 6 may be the DCI format 1_0, that is, the DCI format of the first information may be the same as the DCI format of the second information.

After receiving the first information shown in FIG. 5 and/or FIG. 6, the terminal device may transmit data based on scheduling of the first information.

It should be understood that the first information shown in FIG. 5 and/or FIG. 6 may be applied to a scenario in which the terminal device does not support an uplink HARQ feedback. For example, the network device 101 may send third information to the terminal device, where the third information indicates that the current transmission of the terminal device does not support the uplink HARQ feedback. Alternatively, it may be considered by default that the terminal device supports the uplink HARQ feedback. The third information may be dynamic signaling, for example, DCI signaling. Alternatively, the third information may be higher layer signaling, including radio resource control RRC signaling or a media access control (media access control, MAC) control element (control element, CE).

For example, the terminal device receives the third information from the network device 101. If the third information indicates that the uplink HARQ feedback is not supported, the first information may include the frequency domain resource assignment information field, the time domain resource assignment information field, the VRB-to-PRB mapping information field, and the modulation and coding scheme information field. In addition, the first information does not include at least one of the new data indicator information field, the redundancy version information field, the HARQ process number information field, the downlink assignment index information field, the PUCCH transmission power control command information field, the PUCCH resource indicator information field, or the PDSCH-to-HARQ feedback timing indicator information field. A bitwidth corresponding to at least one of the new data indicator information field, the redundancy version information field, the HARQ process number information field, the downlink assignment index information field, the PUCCH transmission power control command information field, the PUCCH resource indicator information field, or the PDSCH-to-HARQ feedback timing indicator information field in the second information indicates the frequency domain resource assignment in the first information. In this case, the first information may have the structure shown in FIG. 5 and/or FIG. 6.

In addition, if fourth information received by the terminal device indicates that the uplink HARQ feedback is supported, the first information may include the frequency domain resource assignment information field, the time domain resource assignment information field, the VRB-to-PRB mapping information field, the modulation and coding scheme information field, the new data indicator information field, the redundancy version information field, the HARQ process number information field, the downlink assignment index information field, the PUCCH transmission power control command information field, the PUCCH resource indicator information field, and the PDSCH-to-HARQ feedback timing indicator information field. Alternatively, the first information includes at least one of the new data indicator information field, the redundancy version information field, the HARQ process number information field, the downlink assignment index information field, the PUCCH transmission power control command information field, the PUCCH resource indicator information field, and the PDSCH-to-HARQ feedback timing indicator information field. In other words, if the fourth information received by the terminal device indicates that the uplink HARQ feedback is supported, the first information does not include the identifier for DCI formats information field. The fourth information may be dynamic signaling, for example, DCI signaling. Alternatively, the fourth information may be higher layer signaling, including radio resource control RRC signaling or a MAC CE.

In a feasible example, the bitwidth that is in the first information and that corresponds to the first information field may indicate the frequency domain resource assignment. For example, if an $n_{th}$ bitwidth in the second information is a bitwidth occupied by the first information field, in the first information, an $n_{th}$ bitwidth is the bitwidth that is in the first information and that corresponds to the first information field, and may indicate the frequency domain resource assignment. Specifically, if the $n_{th}$ bitwidth in the second information is included in the identifier for DCI formats information field, the new data indicator information field, the redundancy version information field, the HARQ process number information field, the downlink assignment index information field, the PUCCH transmission power control information field, the PUCCH resource indicator information field, or the PDSCH-to-HARQ feedback timing indicator information field, the $n_{th}$ bitwidth in the first information may indicate the frequency domain resource assignment. In other words, the $n_{th}$ bitwidth in the first information is included in the frequency domain resource assignment information field, and n is a positive integer. For example, in the information field in the second information, the first bitwidth indicates the DCI format. To be specific, in the information field in the second information, bitwidths corresponding to the identifier for DCI formats information field include the first bitwidth in the information field in the second information. In the first information, the first bitwidth is a bit in the frequency domain resource assignment information field.

Figure 7:
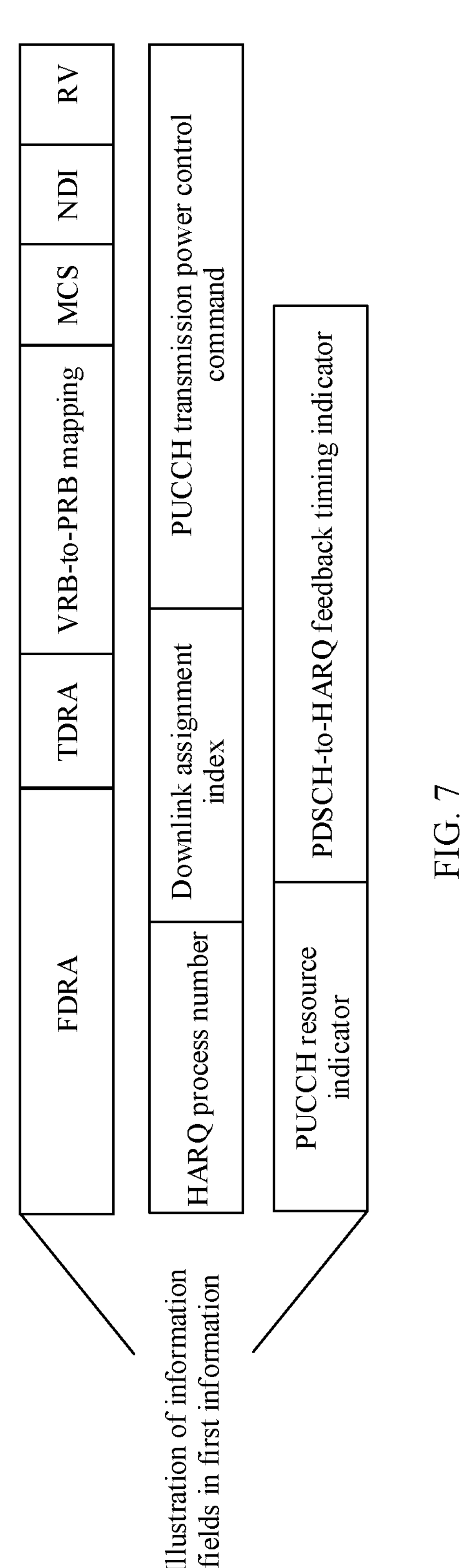
FIG. 7 is another schematic diagram of distribution of information fields in first information according to an embodiment of this application.

In another possible example, the DCI format of the first information is different from the DCI format 1_0. The payload of the first information may be different from the payload of the second information. All bitwidths in the first information have respective functions. The first information may not include the reserved bit. The first information does not include the first information field. As shown in FIG. 7, information fields in the first information in this application include a frequency domain resource assignment information field, a time domain resource assignment information field, a VRB-to-PRB mapping information field, a modulation and coding scheme information field, a new data indicator information field, a redundancy version information field, a HARQ process number information field, a downlink assignment index information field, a PUCCH transmission power control command information field, a PUCCH resource indicator information field, and a PDSCH-to-HARQ feedback timing indicator information field. Alternatively, the information fields in the first information are the frequency domain resource assignment information field, the time domain resource assignment information field, the VRB-to-PRB mapping information field, and the modulation and coding scheme information field.

For example, a size of the time domain resource assignment information field in the first information shown in FIG. 7 may be the same as a size of the time domain resource assignment information field in the second information, for example, both are 4 bits. A size of the VRB-to-PRB mapping information field in the first information may be the same as a size of the VRB-to-PRB mapping information field in the second information, for example, both are 1 bit. A size of the modulation and coding scheme information field in the first information may be the same as a size of the modulation and coding scheme information field in the second information, for example, both are 5 bits. A size of the new data indicator information field in the first information may be the same as a size of the new data indicator information field in the second information, for example, both are 1 bit. A size of the downlink assignment index information field in the first information may be the same as a size of the downlink assignment index information field in the second information, for example, both are 2 bits. A size of the PUCCH transmission power control command information field in the first information may be the same as a size of the PUCCH transmission power control command information field in the second information, for example, both are 2 bits.

Further, a bitwidth occupied by the first information field in the second information may indicate frequency domain resource assignment in the first information shown in FIG. 7. In other words, the bitwidth occupied by the first information field in the second information is included in the FDRA information field shown in FIG. 6, so that a size of the frequency domain resource assignment information field is increased, or a quantity of bitwidths included in the frequency domain resource assignment information field is increased, to implement more flexibility of indicating a frequency domain resource. For example, the first bitwidth in the second information is a bitwidth occupied by an identifier for DCI formats information field, the first information does not include the identifier for DCI formats information field, and the first bitwidth in the first information indicates the frequency domain resource assignment.

Optionally, the size of the FDRA field is determined by a frequency domain width of a first frequency domain resource. The size of the frequency domain resource assignment information field shown in FIG. 6 is associated with the width of the first frequency domain resource (for example, a quantity of RBs of the first frequency domain resource). For example, a size L of the frequency domain resource assignment information field meets Formula 4.

Further, the network device 101 may set a necessary information field and a necessary bit quantity in broadcast/multicast DCI by using higher layer signaling:

In FIG. 7, a size of the redundancy version information field may be determined by the terminal device based on first indication information from the network device 101. The first indication information may be RRC signaling. The first indication information indicates a bit quantity m of the redundancy version information field. When m=0, a redundancy version of a data channel scheduled by using the first information is RV0 by default. When m=1, redundancy versions that are of the data channel and that are indicated by the redundancy version information field may be RV0 and RV3, RV0 and RV2, or RV0 and RV1.

In FIG. 7, a size of the HARQ process number information field may be determined by the terminal device based on second indication information from the network device 101. The second indication information may be RRC signaling. The second indication information indicates a bit quantity n of the HARQ process number information field. Alternatively, a quantity of the second indication information is $I_1$, and $n=\lceil \log_2(I_1) \rceil$. When n=0, a HARQ process number of a PDSCH scheduled by using the first information is 1 or 0; when n=1, the PDSCH scheduled by using the first information has a maximum of two processes; when n=2, the PDSCH scheduled by using the first information has a maximum of four processes; when n=3, the PDSCH scheduled by using the first information has a maximum of eight processes; and when n=4, the PDSCH scheduled by using the first information has a maximum of 16 processes.

In FIG. 7, a size of the PDSCH-to-HARQ feedback timing indicator information field may be determined by the terminal device based on third indication information from the network device 101. The third indication information may be RRC signaling. The third indication information indicates a bit quantity q in the information field. Alternatively, a quantity of pieces of third indication information is $I_2$, and $q=\lceil \log_2(I_2) \rceil$. A value of q may be 0, 1, 2, or 3. When q is 0, PDSCH-to-HARQ feedback timing is determined by a higher layer parameter.

In FIG. 7, a size of the PUCCH resource indicator information field may be determined by the terminal device based on fourth indication information from the network device 101. The fourth indication information may be RRC signaling. The fourth indication information indicates a bit quantity p in the information field. Alternatively, a quantity of pieces of fourth indication information is $I_3$, and $p=\lceil \log_2(I_3) \rceil$. A value of p may be 0, 1, 2, or 3. When p is 0, a PUCCH resource is determined by a higher layer parameter.

Figure 8:
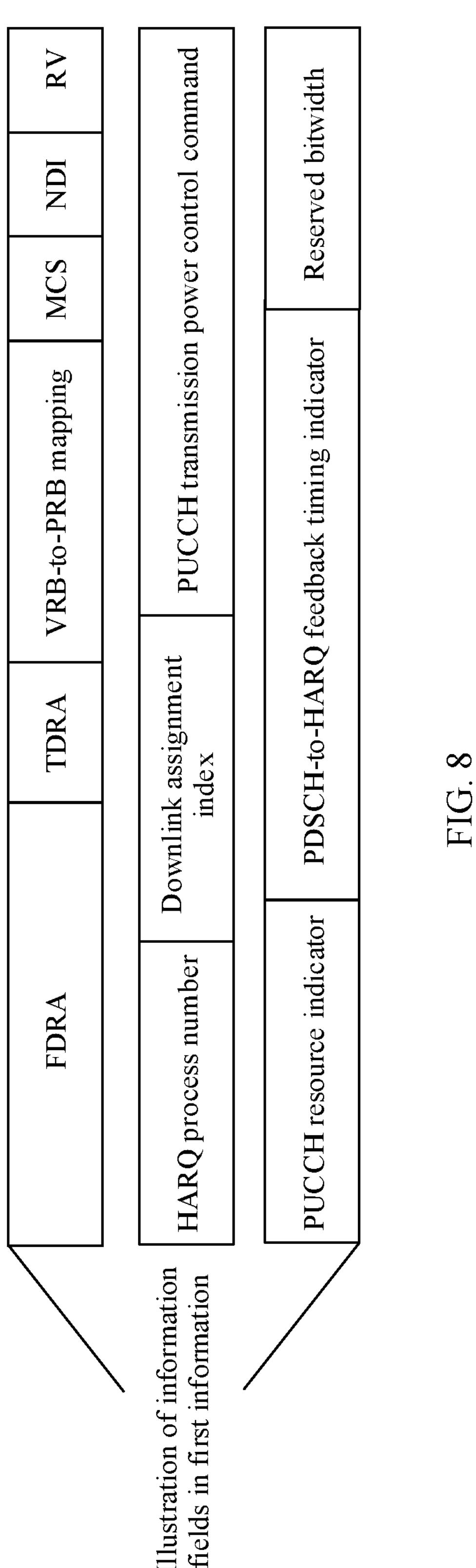
FIG. 8 is another schematic diagram of distribution of information fields in first information according to an embodiment of this application.

In addition, to ensure that a payload of the first information is the same as a payload of the second information, several reserved bitwidths need to be added to the first information. As shown in FIG. 8, in this case, information fields in the first information may include a frequency domain resource assignment information field, a time domain resource assignment information field, a VRB-to-PRB mapping information field, a modulation and coding scheme information field, a new data indicator information field, a redundancy version information field, a HARQ process number information field, a downlink assignment index information field, a PUCCH transmission power control command information field, a PUCCH resource indicator information field, a PDSCH-to-HARQ feedback timing indicator information field, and the reserved bitwidth.

For example, a size $L_0$ of the reserved bitwidth may meet the following formula:

$$L_0=l-L+K-m-n-q-p; \quad \text{(Formula 7)}$$

l is determined based on a width of a CORESET 0 an initial BWP. For example, l meets Formula 4. L meets Formula 5. K is a sum of sizes of an identifier for DCI formats information field, the time domain resource assignment information field, the VRB-to-PRB mapping information field, the modulation and coding scheme information field, the new data indicator information field, the redundancy version information field, the HARQ process number information field, the downlink assignment index information field, the PUCCH transmission power control command information field, the PUCCH resource indicator information field, and the PDSCH-to-HARQ feedback timing indicator information field in the second information. m is the size of the redundancy version information field in the first information. n is a length of the HARQ process number information field in the first information. q is a length of the PDSCH-to-HARQ feedback timing indicator information field in the first information. p is a length of the PUCCH resource indicator information field in the first information.

It should be understood that the format of the first information shown in FIG. 7 and/or FIG. 8 may be different from the DCI format 1_0, a DCI format 1_1, and/or a DCI format 1_2.

In this example, it should be understood that the first information shown in FIG. 7 and/or FIG. 8 may be applied to a scenario in which the terminal device does not support an uplink HARQ feedback. For example, the network device 101 may send fourth information to the terminal device, where the fourth information indicates that the terminal device supports the uplink HARQ feedback. Alternatively, it may be considered by default that the terminal device supports the uplink HARQ feedback.

For example, if the fourth information received by the terminal device indicates that the uplink HARQ feedback is supported, a bitwidth that corresponds to the identifier for DCI formats information field and that is in the second information indicates the frequency domain resource assignment in the first information. In this case, an information field structure in the first information may be shown in FIG. 7 and/or FIG. 8. To be specific, the information fields in the first information may include the frequency domain resource assignment information field, the time domain resource assignment information field, the VRB-to-PRB mapping information field, the modulation and coding scheme information field, the new data indicator information field, the redundancy version information field, the HARQ process number information field, the downlink assignment index information field, the PUCCH transmission power control command information field, the PUCCH resource indicator information field, and the PDSCH-to-HARQ feedback timing indicator information field.

After S102, the network device 101 may send a data channel to the terminal device, and the terminal device receives the data channel based on the frequency domain resource indicated by the first information.

Based on a same inventive concept as that of the foregoing method embodiments, embodiments of this application further provide a communication apparatus. The communication apparatus may have functions, steps, or operations of the network device or the terminal device in the foregoing method embodiments. For example, functional modules corresponding to the functions, the steps, or the operations in the foregoing methods may be disposed in the communication apparatus, to support the communication apparatus in performing the foregoing methods. The functions may be implemented by hardware, or may be implemented by software or hardware executing corresponding software. The hardware or the software includes one or more modules corresponding to the functions. For example, the communication apparatus may be a chip or a communication chip having a communication module, or may be implemented by the chip or the communication chip having the communication module.

Figures 9, 10:
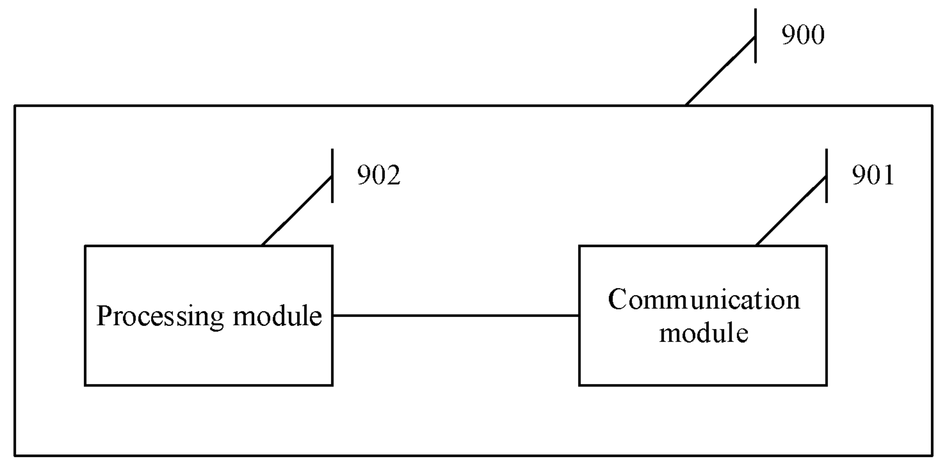
FIG. 9 is a schematic diagram of a structure of a communication apparatus according to an embodiment of this application.
FIG. 10 is another schematic diagram of a structure of a communication apparatus according to an embodiment of this application.

In a possible implementation, a communication apparatus 900 shown in FIG. 9 may be used as the terminal device in the foregoing method embodiments, and perform the steps performed by the terminal device in the foregoing method embodiments. As shown in FIG. 9, the communication apparatus 900 may include a communication module 901 and a processing module 902. The communication module 901 and the processing module 902 are coupled to each other. The communication module 901 may be configured to support the communication apparatus 900 in performing communication. The communication module 901 may have a wireless communication function, for example, can perform wireless communication with another communication apparatus through a radio air interface. The processing module 902 may be configured to support the communication apparatus 900 in performing the processing actions in the foregoing method embodiments, including but not limited to: generating information and a message that are sent by the communication module 901, and/or demodulating and decoding a signal received by the communication module 901, and the like.

Figure 3:
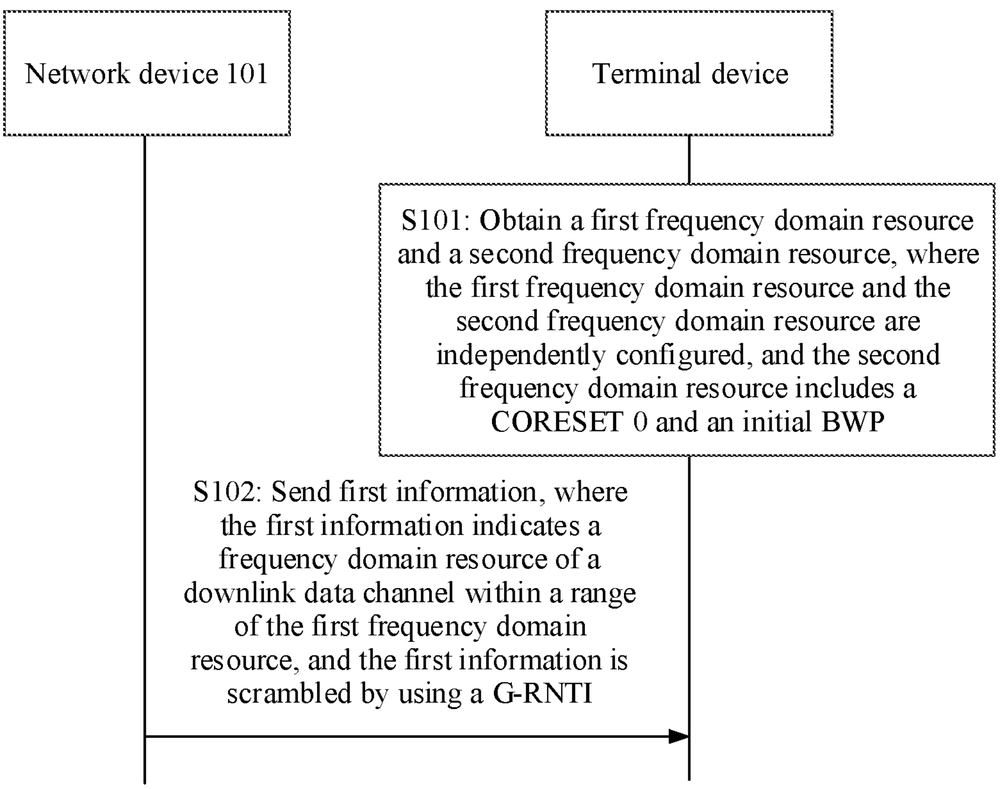
FIG. 3 is a schematic flowchart of a communication method according to an embodiment of this application.

The communication module 901 may be specifically configured to perform the sending and/or receiving actions of the terminal device in the communication method shown in FIG. 3. For example, the communication module 901 may be configured to perform an action of sending information, a message, or signaling by the terminal device to a network device, or configured to perform an action of receiving information, a message, or signaling from the network device.

The processing module 902 may be specifically configured to perform a processing action of the terminal device in the communication method shown in FIG. 3, for example, configured to control the communication module 901 to send and/or receive information, a message, or signaling, and perform an operation such as information processing.

For example, the processing module 902 may be configured to obtain a first frequency domain resource and a second frequency domain resource. The first frequency domain resource and the second frequency domain resource are independently configured, and the second frequency domain resource includes a CORESET 0 and an initial BWP. The communication module 901 may be configured to receive first information, where the first information is used to schedule a downlink data channel. The first information includes frequency domain resource assignment information, where the frequency domain resource assignment information indicates a frequency domain resource of the downlink data channel within a range of the first frequency domain resource. The first information is scrambled by using a G-RNTI. The first frequency domain resource and/or the second frequency domain resource may be configured by the network device. For a manner of setting the first information, refer to the descriptions in the method embodiments of this application.

For example, the communication module 901 may be further configured to receive second information, where the second information is in a DCI format 1_0, and the second information is scrambled by using a C-RNTI. For a manner of setting the second information, refer to the descriptions in the method embodiments of this application.

The communication module 901 may be further configured to receive third information from the network device. The third information indicates that the terminal device does not support an uplink HARQ feedback. For a manner of setting the third information, refer to the descriptions in the method embodiments of this application.

In another possible implementation, the communication apparatus provided in this embodiment of this application may alternatively include a hardware component, for example, a processor, a memory, or a transceiver. For ease of understanding and illustration, in FIG. 10, a mobile phone is used as an example to describe a possible structure of the terminal device. As shown in FIG. 10, a communication apparatus 1000 may include a processor 1001, a memory 1002, and a transceiver 1003.

The foregoing processor 1001 may be configured to process a communication protocol and communication data, control the terminal device, execute a software program, process data of the software program, and the like. The memory 1002 may be configured to store a program and data, and the processor 1001 may perform the method performed by the terminal device in embodiments of this application based on the program.

The transceiver 1003 may include a radio frequency unit and an antenna. The radio frequency unit may be configured to perform conversion between a baseband signal and a radio frequency signal, and process the radio frequency signal. The antenna may be configured to send and receive a radio frequency signal in a form of an electromagnetic wave. In addition, only the radio frequency unit may be considered as the transceiver 1003. In this case, the communication apparatus 1000 may include the processor 1001, the memory 1002, the transceiver 1003, and an antenna.

In addition, the communication apparatus 1000 may further include an input/output apparatus 1004, for example, a component such as a touchscreen, a display screen, or a keyboard that may be configured to receive data entered by a user and output data to the user. It should be noted that some types of communication apparatuses may have no input/output apparatus.

Based on the structure shown in FIG. 10, when the communication apparatus 1000 needs to send data, the processor 1001 may perform baseband processing on the to-be-sent data and output a baseband signal to the radio frequency unit, and the radio frequency unit performs radio frequency processing on the baseband signal and sends a radio frequency signal in an electromagnetic wave form through the antenna. When data is sent to the communication apparatus 1000, the radio frequency unit receives the radio frequency signal through the antenna, converts the radio frequency signal into a baseband signal, and outputs the baseband signal to the processor 1001. The processor 1001 converts the baseband signal into data, and processes the data.

For example, the processor 1001 may be configured to obtain a first frequency domain resource and a second frequency domain resource. The first frequency domain resource and the second frequency domain resource are independently configured, and the second frequency domain resource includes a CORESET 0 and an initial BWP. The transceiver 1003 may be configured to receive first information, where the first information is used to schedule a downlink data channel. The first information includes frequency domain resource assignment information, where the frequency domain resource assignment information indicates a frequency domain resource of the downlink data channel within a range of the first frequency domain resource. The first information is scrambled by using a G-RNTI. The first frequency domain resource and/or the second frequency domain resource may be configured by the network device. For a manner of setting the first information, refer to the descriptions in the method embodiments of this application.

For example, the transceiver 1003 may be further configured to receive second information, where the second information is in a DCI format 1_0, and the second information is scrambled by using a C-RNTI. For a manner of setting the second information, refer to the descriptions in the method embodiments of this application.

The transceiver 1003 may be further configured to receive third information from the network device. The third information indicates that the terminal device does not support an uplink HARQ feedback. For a manner of setting the third information, refer to the descriptions in the method embodiments of this application.

Figure 11:
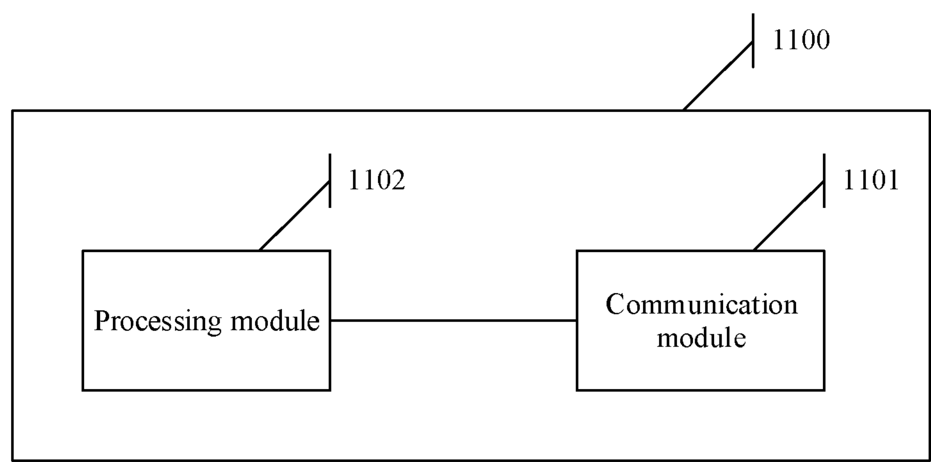
FIG. 11 is another schematic diagram of a structure of a communication apparatus according to an embodiment of this application.

As shown in FIG. 11, a communication apparatus 1100 may be used as the network device in the foregoing method embodiments, and perform the steps performed by the network device in the foregoing method embodiments. As shown in FIG. 11, the communication apparatus 1100 may include a communication module 1101 and a processing module 1102. The communication module 1101 and the processing module 1102 are coupled to each other. The communication module 1101 may be configured to support the communication apparatus 1100 in performing communication. The communication module 1101 may have a wireless communication function, for example, can perform wireless communication with another communication apparatus through a radio air interface. The processing module 1102 may be configured to support the communication apparatus 1100 in performing the processing actions in the foregoing method embodiments, including but not limited to: generating information and a message that are sent by the communication module 1101, and/or demodulating and decoding a signal received by the communication module 1101, and the like.

The communication module 1101 may be specifically configured to perform actions of the network device 101 in the communication method shown in FIG. 3. For example, the communication module 1101 may be configured to perform an action of sending information, a message, or signaling by the network device 101 to a terminal device, or configured to perform an action of receiving information, a message, or signaling from a first communication device or the network device 101.

The processing module 1102 may be specifically configured to perform a processing action of the network device, a third communication device, and/or a fourth communication device in the communication method shown in FIG. 3, for example, configured to control the communication module 1101 to send and/or receive information, a message, or signaling, and perform an operation such as information processing.

For example, the processing module 1102 may be configured to determine a first frequency domain resource and a second frequency domain resource. The first frequency domain resource and the second frequency domain resource are independently configured, and the second frequency domain resource includes a CORESET 0 and an initial BWP. The communication module 1101 may be configured to send first information to the terminal device, where the first information is used to schedule a downlink data channel of the terminal device. The first information includes frequency domain resource assignment information, where the frequency domain resource assignment information indicates a frequency domain resource of the downlink data channel within a range of the first frequency domain resource. The first information is scrambled by using a G-RNTI. For a manner of setting the first information, refer to the descriptions in the method embodiments of this application.

In addition, the communication module 1101 may be further configured to send second information to the terminal device, where the second information is in a DCI format 1_0, and the second information is scrambled by using a C-RNTI. For a manner of setting the second information, refer to the descriptions in the method embodiments of this application.

The communication module 1101 may be further configured to send third information to the terminal device. The third information indicates that the terminal device does not support an uplink HARQ feedback. For a manner of setting the third information, refer to the descriptions in the method embodiments of this application.

In another possible implementation, a communication apparatus provided in this embodiment of this application may alternatively include a hardware component, for example, a processor, a memory, or a transceiver, to implement functions of the network device in this application.

Figure 12:
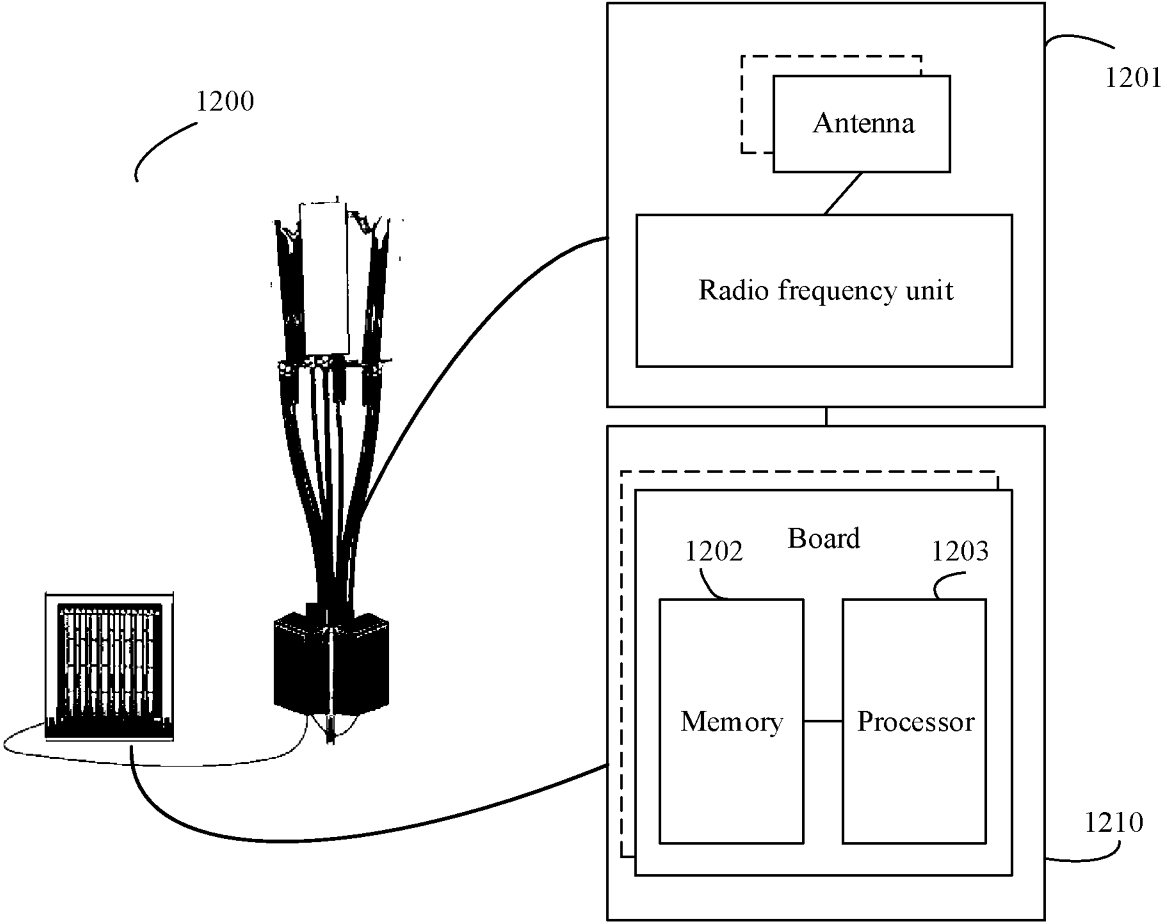
FIG. 12 is another schematic diagram of a structure of a communication apparatus according to an embodiment of this application.

For ease of understanding, in FIG. 12, a base station is used as an example to describe a structure of the communication apparatus. As shown in FIG. 12, a communication apparatus 1200 may include a transceiver 1201, a memory 1202, and a processor 1203, to implement functions of the network device provided in embodiments of this application. The transceiver 1201 may be used by the communication apparatus for communication. The memory 1202 is coupled to the processor 1203, and may be configured to store a program and data that are necessary for the communication apparatus 1200 to implement the functions. The processor 1203 is configured to support the communication apparatus 1200 in performing a corresponding function of the network device in the foregoing method. The function may be implemented by invoking the program stored in the memory 1202.

Specifically, the transceiver 1201 may be a wireless transceiver, and may be configured to support the communication apparatus 1200 in receiving and sending signaling and/or data through a radio air interface. The transceiver 1201 may also be referred to as a transceiver unit or a communication unit. The transceiver 1201 may include a radio frequency unit and one or more antennas, where the radio frequency unit, for example, a remote radio unit (remote radio unit, RRU), may be specifically configured to perform transmission of a radio frequency signal and conversion between a radio frequency signal and a baseband signal, and the one or more antennas may be specifically configured to radiate and receive a radio frequency signal. Optionally, the transceiver 1201 may include only the foregoing radio frequency unit. In this case, the communication apparatus 1200 may include the transceiver 1201, the memory 1202, the processor 1203, and an antenna.

The memory 1202 and the processor 1203 may be integrated or may be independent of each other. As shown in FIG. 12, the memory 1202 and the processor 1203 may be integrated into a control unit 1210 of the communication apparatus 1200. For example, the control unit 1210 may include a baseband unit (baseband unit, BBU) of an LTE base station, and the baseband unit may also be referred to as a digital unit (digital unit, DU), or the control unit 1210 may include a distributed unit (distributed unit, DU) and/or a centralized unit (centralized unit, CU) in a base station in 5G or a future radio access technology. The control unit 1210 may include one or more boards. The plurality of boards may jointly support a radio access network of a single access standard (for example, an LTE network), or the plurality of boards may separately support radio access networks of different access standards (for example, an LTE network, a 5G network, or another network). The memory 1202 and the processor 1203 may serve one or more boards. In other words, the memory 1202 and the processor 1203 may be disposed on each board. Alternatively, the plurality of boards may share the same memory 1202 and the same processor 1203. In addition, a necessary circuit may be disposed on each board. For example, the circuit may be configured to implement coupling between the memory 1202 and the processor 1203. The transceiver 1201, the processor 1203, and the memory 1202 may be connected by using a bus (bus) structure and/or another connection medium.

Based on the structure shown in FIG. 12, when the communication apparatus 1200 needs to send data, the processor 1203 may perform baseband processing on the to-be-sent data and output a baseband signal to the radio frequency unit, and the radio frequency unit performs radio frequency processing on the baseband signal and sends a radio frequency signal in an electromagnetic wave form through the antenna. When data is sent to the communication apparatus 1200, the radio frequency unit receives the radio frequency signal through the antenna, converts the radio frequency signal into a baseband signal, and outputs the baseband signal to the processor 1203. The processor 1203 converts the baseband signal into data, and processes the data.

When the communication method provided in embodiments of this application is implemented, the processor 1203 may be configured to determine a first frequency domain resource and a second frequency domain resource. The first frequency domain resource and the second frequency domain resource are independently configured, and the second frequency domain resource includes a CORESET 0 and an initial BWP. The transceiver 1201 may be configured to send first information to a terminal device, where the first information is used to schedule a downlink data channel of the terminal device. The first information includes frequency domain resource assignment information, where the frequency domain resource assignment information indicates a frequency domain resource of the downlink data channel within a range of the first frequency domain resource. The first information is scrambled by using a G-RNTI. For a manner of setting the first information, refer to the descriptions in the method embodiments of this application.

For example, the transceiver 1201 may be further configured to send second information to the terminal device, where the second information is in a DCI format 1_0, and the second information is scrambled by using a C-RNTI. For a manner of setting the second information, refer to the descriptions in the method embodiments of this application.

The transceiver 1201 may be further configured to send third information to the terminal device. The third information indicates that the terminal device does not support an uplink HARQ feedback. For a manner of setting the third information, refer to the descriptions in the method embodiments of this application.

In addition, based on an actual use requirement, the communication apparatus provided in embodiments of this application may include a processor, and the processor invokes an external transceiver and/or memory to implement the foregoing functions, steps, or operations. The communication apparatus may further include a memory, and the processor invokes and executes a program stored in the memory, to implement the foregoing functions, steps, or operations. Alternatively, the communication apparatus may include a processor, namely, a transceiver. The processor invokes and executes a program stored in an external memory, to implement the foregoing functions, steps, or operations. Alternatively, the communication apparatus may include a processor, a memory, and a transceiver.

Based on a same concept as that of the foregoing method embodiments, embodiments of this application further provide a computer-readable storage medium. The computer-readable storage medium stores program instructions (or referred to as a computer program or instructions). When the program instructions are executed by a processor, a computer is enabled to perform an operation performed by the network device and/or the terminal device in any one of the foregoing method embodiments and the possible implementations of the foregoing method embodiments.

Based on a same concept as that of the foregoing method embodiments, this application further provides a computer program product, including program instructions. When the computer program product is invoked and executed by a computer, the computer may be enabled to implement an operation performed by the network device and/or the terminal device in any one of the foregoing method embodiments and the possible implementations of the foregoing method embodiments.

Based on a same concept as that of the foregoing method embodiments, this application further provides a chip or a chip system. The chip is coupled to a transceiver, and is configured to implement an operation performed by the network device and/or the terminal device in any one of the foregoing method embodiments and the possible implementations of the foregoing method embodiments. The chip system may include the chip and components such as a memory and a communication interface.

Based on a same concept as that of the foregoing method embodiments, this application further provides a communication system. The communication system may be configured to implement an operation performed by the network device and/or the terminal device in any one of the foregoing method embodiments and the possible implementations of the foregoing method embodiments. For example, the communication system has the structure shown in FIG. 1.

Using the communication system shown in FIG. 1 as an example, the network device 101 may be configured to determine a first frequency domain resource and a second frequency domain resource. The first frequency domain resource and the second frequency domain resource are independently configured, and the second frequency domain resource includes a CORESET 0 and an initial BWP. The terminal device may obtain the first frequency domain resource and the second frequency domain resource. In addition, the network device 101 may further send first information to the terminal device, where the first information is used to schedule a downlink data channel of the terminal device. Correspondingly, the terminal device may receive the first information. For a manner of setting the first information, refer to the descriptions in the method embodiments of this application.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Certainly, a person skilled in the art can make various modifications and variations to this application without departing from the protection scope of this application. This application is intended to cover these modifications and variations of this application provided that they fall within the scope of protection defined by the following claims and their equivalent technologies.

What is claimed is:

1. A communication method, applied in a terminal device or a chip in the terminal device, comprising:

receiving a first configuration information that indicates a first frequency domain resource for multicast;

receiving a second configuration information that indicates a second frequency domain resource, wherein the second frequency domain resource comprises at least one of a control-resource set (CORESET) 0 and an initial bandwidth part (BWP), and wherein the first frequency domain resource and the second frequency domain resource are configured by using different fields; and receiving first information, wherein the first information is for scheduling a downlink data channel, the first information comprises frequency domain resource assignment information, wherein the frequency domain resource assignment information indicates a frequency domain resource of the downlink data channel within a range of the first frequency domain resource, and the first information is scrambled by using a group-radio network temporary identifier (G-RNTI).

2. The method according to claim 1, wherein the first information does not comprise a physical uplink control channel (PUCCH) transmission power control command.

3. The method according to claim 1, wherein the first information does not comprise downlink control information (DCI) format identifier information, and the DCI format identifier information indicates an uplink DCI format or a downlink DCI format.

4. The method according to claim 1, wherein the method further comprises:

receiving second information, wherein the second information is in a DCI format 1_0, and the second information is scrambled by using a cell-radio network temporary identifier (C-RNTI), wherein the second information comprises an information field of the following information:

an identifier for DCI formats, frequency domain resource assignment, time domain resource assignment, a virtual resource block (VRB)-to-physical resource block (PRB) mapping, a modulation and coding scheme, a new data indicator, a redundancy version, a HARQ process number, a downlink assignment index, a PUCCH transmission power control command, a PUCCH resource indicator, and a PDSCH-to-HARQ feedback timing indicator.

5. The communication method according to claim 1, wherein the downlink data channel is a multicast data channel.

6. The communication method according to claim 1, wherein the first configuration information is carried in higher layer signaling, and the second configuration information is carried in system information.

7. A communication method, applied in a network device or a chip in the network device, comprising:

sending a first configuration information that indicates a first frequency domain resource for multicast;

sending a second configuration information that indicates a second frequency domain resource, wherein the second frequency domain resource comprises a CORESET 0 and an initial BWP, and wherein the first frequency domain resource and the second frequency domain resource are configured by using different fields; and sending first information, wherein the first information is for scheduling a terminal device to send a downlink data channel, the first information comprises frequency domain resource assignment information, wherein the frequency domain resource assignment information indicates a frequency domain resource of the downlink data channel within a range of the first frequency domain resource, and the first information is scrambled by using a G-RNTI.

8. The method according to claim 7, wherein the first information does not comprise a PUCCH transmission power control command.

9. The method according to claim 7, wherein the first information does not comprise DCI format identifier information, and the DCI format identifier information indicates an uplink DCI format or a downlink DCI format.

10. The method according to claim 7, wherein the method further comprises:

sending second information, wherein the second information is in a DCI format 1_0, and the second information is scrambled by using a C-RNTI, wherein the second information comprises an information field of the following information:

an identifier for DCI formats, frequency domain resource assignment, time domain resource assignment, a VRB-to-PRB mapping, a modulation and coding scheme, a new data indicator, a redundancy version, a HARQ process number, a downlink assignment index, a PUCCH transmission power control command, a PUCCH resource indicator, and a PDSCH-to-HARQ feedback timing indicator.

11. The communication method according to claim 7, wherein the downlink data channel is a multicast data channel.

12. The communication method according to claim 7, wherein the first configuration information is carried in higher layer signaling, and the second configuration information is carried in system information.

13. A communication apparatus, comprising:

at least one processor connected to a memory, wherein the at least one processor is configured to read and execute a program stored in the memory, to enable the apparatus toa transceiver;

receive a first configuration information that indicates a first frequency domain resource for multicast;

receive a second configuration information that indicates a second frequency domain resource, wherein the second frequency domain resource comprises a control-resource set (CORESET) 0 and an initial bandwidth part (BWP), and wherein the first frequency domain resource and the second frequency domain resource are configured by using different fields; and receive, through the transceiver, a first information, wherein the first information is for scheduling a downlink data channel, the first information comprises frequency domain resource assignment information, wherein the frequency domain resource assignment information indicates a frequency domain resource of the downlink data channel within a range of the first frequency domain resource, and the first information is scrambled by using a group-radio network temporary identifier (G-RNTI).

14. The communication apparatus according to claim 13, wherein the first information does not comprise a physical uplink control channel (PUCCH) transmission power control command.

15. The communication apparatus according to claim 13, wherein the first information does not comprise downlink control information (DCI) format identifier information, and the DCI format identifier information indicates an uplink DCI format or a downlink DCI format.

16. The communication apparatus according to claim 13, wherein the transceiver, further configured to receive a second information, wherein the second information is in a DCI format 1_0, and the second information is scrambled by using a cell-radio network temporary identifier (C-RNTI), wherein the second information comprises an information field of the following information:

an identifier for DCI formats, frequency domain resource assignment, time domain resource assignment, a virtual resource block (VRB)-to-physical resource block (PRB) mapping, a modulation and coding scheme, a new data indicator, a redundancy version, a HARQ process number, a downlink assignment index, a PUCCH transmission power control command, a PUCCH resource indicator, and a PDSCH-to-HARQ feedback timing indicator.

17. A communication apparatus, comprising:

at least one processor connected to a memory, wherein the at least one processor is configured to read and execute a program stored in the memory, to enable the apparatus to:

send a first configuration information that indicates a first frequency domain resource for multicast;

send a second configuration information that indicates a second frequency domain resource, wherein the second frequency domain resource comprises a CORESET 0 and an initial BWP, and wherein the first frequency domain resource and the second frequency domain resource are configured by using different fields; and send, through the transceiver, a first information, wherein the first information is for scheduling a terminal device to send a downlink data channel, the first information comprises frequency domain resource assignment information, wherein the frequency domain resource assignment information indicates a frequency domain resource of the downlink data channel within a range of the first frequency domain resource, and the first information is scrambled by using a G-RNTI.

18. The communication apparatus according to claim 17, wherein the first information does not comprise a PUCCH transmission power control command.

19. The communication apparatus according to claim 17, wherein the first information does not comprise DCI format identifier information, and the DCI format identifier information indicates an uplink DCI format or a downlink DCI format.

20. The communication apparatus according to claim 17, wherein programming instructions, when executed by the at least one processor, cause the communication apparatus to send, through the transceiver, a second information to the terminal device, wherein the second information is in a DCI format 1_0, and the second information is scrambled by using a C-RNTI, wherein the second information comprises an information field of the following information:

an identifier for DCI formats, frequency domain resource assignment, time domain resource assignment, a VRB-to-PRB mapping, a modulation and coding scheme, a new data indicator, a redundancy version, a HARQ process number, a downlink assignment index, a PUCCH transmission power control command, a PUCCH resource indicator, and a PDSCH-to-HARQ feedback timing indicator.

* * * * *